United States Patent
Huang et al.

(10) Patent No.: US 11,924,653 B2
(45) Date of Patent: Mar. 5, 2024

(54) HIGH THROUGHPUT CONTROL INFORMATION AND FIELD EXTENSION

(71) Applicant: Intel Corporation, Santa Clara, CA (US)

(72) Inventors: Po-Kai Huang, San Jose, CA (US); Daniel F. Bravo, Portland, OR (US); Danny Alexander, Neve Efraim Monoson (IL); Arik Klein, Givaat Shmuel (IL); Danny Ben-Ari, Tsur Natan (IL); Laurent Cariou, Portland, OR (US); Robert Stacey, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 260 days.

(21) Appl. No.: 17/134,070

(22) Filed: Dec. 24, 2020

(65) Prior Publication Data

US 2021/0136605 A1    May 6, 2021

Related U.S. Application Data

(60) Provisional application No. 63/022,762, filed on May 11, 2020, provisional application No. 62/984,957, filed on Mar. 4, 2020.

(51) Int. Cl.
| | |
|---|---|
| *H04W 84/12* | (2009.01) |
| *H04W 24/04* | (2009.01) |
| *H04W 24/10* | (2009.01) |
| *H04W 28/06* | (2009.01) |
| *H04W 72/51* | (2023.01) |
| *H04W 72/54* | (2023.01) |

(52) U.S. Cl.
CPC .......... *H04W 24/04* (2013.01); *H04W 24/10* (2013.01); *H04W 28/06* (2013.01); *H04W 72/51* (2023.01); *H04W 72/54* (2023.01); *H04W 84/12* (2013.01)

(58) Field of Classification Search
CPC ..... H04W 24/04; H04W 72/51; H04W 72/54; H04W 24/10; H04W 28/06; H04W 84/12
USPC ....................................................... 370/252
See application file for complete search history.

(56) References Cited

U.S. PATENT DOCUMENTS

| | | | | |
|---|---|---|---|---|
| 2016/0323426 | A1* | 11/2016 | Hedayat | H04W 28/0268 |
| 2017/0251392 | A1* | 8/2017 | Nabetani | H04B 7/0626 |
| 2021/0099256 | A1* | 4/2021 | Lee | H04L 1/1893 |
| 2021/0259033 | A1* | 8/2021 | Kim | H04W 76/11 |

\* cited by examiner

*Primary Examiner* — Christopher R Crompton
(74) *Attorney, Agent, or Firm* — Eversheds Sutherland (US) LLP

(57) ABSTRACT

This disclosure describes systems, methods, and devices related to high throughput (HT) control information. A device may determine a frame comprising HT control information. The device may determine to extend a size of the HT control information. The device may cause to generate a management or data frame for sending to a first station device of one or more station devices, the management or data frame comprising extended high throughput (HT) control information, define a new control identification (ID) associated with the extended HT control information, and cause to send the management or data frame to the first station device.

20 Claims, 21 Drawing Sheets

| Control ID Value | Meaning | Length of the Control Information Subfield (bits) |
| --- | --- | --- |
| 0 | Triggered Response Scheduling (TRS) | 26 |
| 1 | Operating Mode (OM) | 12 |
| 2 | HE Link Adaptation (HLA) | 26 |
| 3 | Buffer Status Report (BSR) | 26 |
| 4 | UL Power Headroom (UPH) | 8 |
| 5 | Bandwidth Query Report (BQR) | 10 |
| 6 | Command And Status (CAS) | 8 |
| 7-14 | Reserved | |
| 15 | Ones Need Expansion Surely (ONES) | 26 |

FIG. 7

| Ack Type subfield values | TID subfield values | Presence of Block Ack Starting Sequence Control subfield and Block Ack Bitmap subfields | Context of a Per AID TID Info subfield in a Multi-STA BlockAck frame |
|---|---|---|---|
| 0 | 0-7 | Present | Block acknowledgment context: Sent as an acknowledgment to QoS Data frames that solicit a Block Ack frame response or to a BlockAckReq frame. |
| 1 | 0-7 | Not present | Acknowledgment context: Sent as an acknowledgment to a QoS Data or QoS Null frame that solicits an Ack frame response. |
| 0 or 1 | 8-13 | N/A | Reserved |
| 0 | 14 | N/A | Reserved |
| 1 | 14 | Not present | All-ack context: Sent as an acknowledgment to an A-MPDU that contains an MPDU that solicits an immediate response and all MPDUs contained in the A-MPDU are received successfully. |
| 0 | 15 | N/A | Reserved |
| 1 | 15 | Not present | Management/PS-Poll frame acknowledgment context: Sent as an acknowledgment to a Management or PS-Poll frame. |

FIG. 11

| Variant | B0 | B1 | B2-B5 | B6-B29 | B30 | B31 |
|---|---|---|---|---|---|---|
| EHT | 1 | 0 | 1110 | EHT Control Information Field | | |

FIG. 14

HIGH THROUGHPUT CONTROL INFORMATION AND FIELD EXTENSION

CROSS-REFERENCE TO RELATED APPLICATIONS

This application is related to and claims priority to U.S. Provisional Application No. 63/022,762, filed May 11, 2020, and U.S. Provisional Application No. 62/984,957, filed Mar. 4, 2020, the disclosures which are hereby incorporated herein by reference in their entirety.

TECHNICAL FIELD

This disclosure generally relates to systems and methods for wireless communications and, more particularly, to high throughput (HT) control information and field extension.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

BRIEF DESCRIPTION OF THE DRAWINGS

FIG. 7 depicts a table of control ID subfield values, in accordance with one or more example embodiments of the present disclosure.

FIG. 11 depicts a table of reserved combination of Ack Type traffic identifier (TID) subfield values, in accordance with one or more example embodiments of the present disclosure.

FIG. 14 illustrates an additional option for HE variant control format for EHT variant control information, where one control ID of HE variant is to create EHT variant HT control, in accordance with one or more example embodiments of the present disclosure.

DETAILED DESCRIPTION

Figure 1:
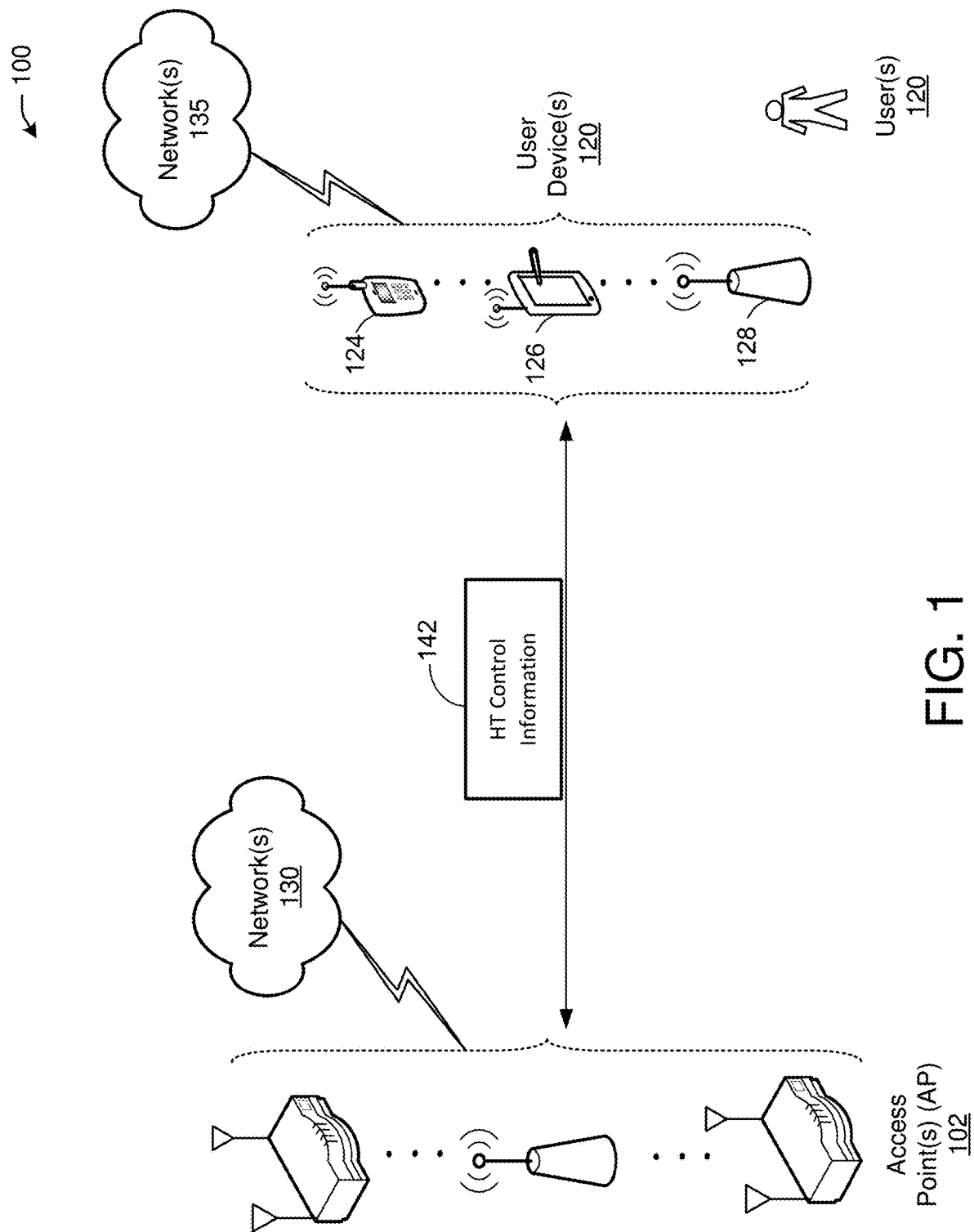
FIG. 1 is a network diagram illustrating an example network environment for HT control information, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Part of the major features of 11be are 320 MHz and 16 spatial streams. Various control information requires extension to support 320 MHz and 16 spatial streams. For example, operating mode (OM) and bandwidth query report (BQR) requires extension to have a larger size.

As the trend of indicating control information in data frame continues, an issue may arise of not being able to include all required control information. For example, all the control information defined in 11ax with 26 bits length of control information, which includes triggered response scheduling (TRS), HE Link adaption (HLA), and buffer status report (BSR) cannot be further extended. Two or more control information with length more than 22 bits cannot be aggregated. It should be appreciated that, as used herein, extending may not necessarily mean changing the size of control ID or other data feature, but rather providing mechanisms for expanding information that may be expressed by the control ID. The receiving device may discard or ignore the padding.

When control information is designed for HT control for HT variants, conventional designs that support legacy systems may not support 320 MHz data transmission and 16 spatial streams. Legacy systems control information subfields such as HT control for HT variants. This may be problematic for functionality needed to accommodate next generation protocols. For example, conventional systems can not aggregate extended OM control information when the OM is extended by 3 bits. For EHT (11be, MLD), it may be advantageous to extend OM by at least an additional 3 bits: one bit for Rx NSS to 16 spatial stream, one bit for channel width to 320 MHz, and one bit for Tx NSTS to 16 spatial streams, which would make extended OM control 16 bits. To accommodate 320 MHz and 16 spatial streams, the OM may also be extended to include link bitmap. As a result, the extended OM control cannot be aggregated together with UPH due to length restrictions.

Extending the existing sequence number space by having additional control information in HT control requires the additional information to be included all the time in data frame for the extension. Expect that for scalability, the size of the extension will be at least 8 bits. This then implies that the extension cannot be aggregated with extended OM control as well, which then makes extended OM control useless. In order to accommodate legacy systems, HT control may not be extendable to a size larger than 32 bits.

Part of the major features of IEEE 802.11be (EHT) are 320 MHz and 16 spatial streams. Various control information requires extension to support 320 MHz and 16 spatial streams. For example, operating mode (OM) and bandwidth query report (BQR) requires extension to have a larger size. Now, based on the high throughput (HT) control field encoding, it is hard to define new EHT variant. If a new EHT variant of HT control is not defined, then control ID space (7 entries remaining) may run out quickly due to the need to define EHT variant of OM, BQR, HE Link adaption (HLA), and other information like cross link power save. There is no previous solution on expanding control ID space.

Example embodiments of the present disclosure relate to systems, methods, and devices for HT Control information and field extension.

In one or more embodiments, a HT control information system may facilitate extending the size of specific HT control information. For example, the HT control information system may extend additional bits from reserved control ID for OM control information and BQR may be advantageous for adding features such as multi-link.

In one or more embodiments, the HT control information system may increase the size of OM control to a size larger than 12 bits to increase specific HT control information. This may be done in several ways, including extending OM control to a size larger than 12 bits. For example, the HT control information system may add a plurality of additional bits for channel width and spatial streams, and may add one additional bit to extend Rx NSS to 4 bits, to indicate up to 16 spatial streams. In another aspect, one additional bit may be added to extend Tx NSTS to 4 bits to indicate up to 16 spatial streams. For extending channel width, the HT control information system may add an additional bit that extends Channel Width to indicate up to 320 MHz. The system may also add a plurality of additional bits to indicate the link that the OM applies to during multi-link operation.

In one or more embodiments, encoding may follow the existing encoding of flax OM control by adding the additional bits after the existing encoding. The HT control information system may redefine the encoding to have contiguous bits for various extension fields.

In one or more embodiments, when the HT control size is extended, the HT control information system may expand ones to a size larger than 26 bits. In one embodiment, the size may be equal to the new size of HT control.

In one or more embodiments, the system may provide new control information indicative of additional bits for sequence number space. For example, size of the control information can be 8 bits.

In one or more embodiments, the HT control information system may facilitate indicating a size for the specific control information field by negotiating the size of specific control information based on the capability of the two or more station devices (STAs). In a first example, the HT control information system may facilitate negotiated HT control information size by extending the size of specific HT control information to support features such as 320 MHz data transmission and 16 spatial streams.

In one or more embodiments, a HT control information system may facilitate negotiated HT control information size by negotiating size of specific control information based on the capability of the two STAs.

In one or more embodiments, the OM control may be used to inform resizing of the control information field. For example, the OMI responder may indicate bit size extension for OM control to include a link ID bitmap. In another aspect, the OMI initiator may be used to extend the size of receive number of spatial streams (RX NSS) and channel width. In another aspect, the OMI initiator may trigger a size extension for channel width.

In one or more embodiments, the STA may also be used to indicate size for specific control fields, such as the BQR control bitmap, Channel width, receive RX NSS, and transmission number of spatial transmission streams (TX NSTS).

In one or more embodiments, the HT control information system may aggregate multiple control information due to increased size of specific control information. The HT control information may facilitate different HT control information content for different MPDUs in an A-MPDU. For example, the HT control information system may allow different HT control content in different MPDUs of an A-MPDU. In other aspects, the HT control information system may omit HT Control information (e.g., by setting +HTC in frame control to 0). The HT control information system may utilize Block Ack and multi-STA block ack to indicate if control information in a specific MPDU is received.

In one or more embodiments, the HT control information system may extend the size of HT control to be larger than 4 bytes, and to indicate the new HT control size. Extending the HT control size may include adding a new data subtype that optionally increases the size of HT control based on entries in data subtypes, which may be based on being an HT or VHT variant, and may further include an indication of extraneous bits proximate to the HT control field. For example, according to a first option, the HT control information system may extend the HT control responsive to a negotiation between two EHT STAs or to EHT MLDs to determine whether HT control is going to use a new size.

In one or more embodiments, the HT control information system may extend HT control responsive to determining that one entry in data subtype is used for QoS data with HT control extension. In another aspect, the HT control information system may extend HT control responsive to determining that one entry in data subtype is used for QoS Null with HT control extension.

In one or more embodiments, the HT control information system may fix the size to a predetermined size. For example, the system may fix the size to 8 bytes or another fixed bit length.

In another aspect, the HT control information system may add padding responsive to determining that the entry type is HT or VHT variant. For example, if the negotiation resolves in the receiving device to be an HT or VHT variant device, then the system may use the extended control field information size, but only use the supported bits for HT or VHT then add a padding to fill the rest of the extended control field information. The HT control information system may redefine HT control format in this case, where there is no need for the previous two bits to indicate HE version before A-control field.

The HT control information system may redefine the HT control format in various ways. For example, in one or more embodiments, the HT control information system may determine that a certain field can indicate the length of the A-control field. According to a second option, two EHT STAs or two EHT MLDs may negotiate to determine whether HT control is going to use a new size. According to a third option, the HT control information system may define a control ID to indicate the usage of the new size for the HD control information.

In one aspect, the HT control information system may set the control ID as the first value in the HT control field. Additionally, the HT control information system may include control information to indicate the size of HT control size.

In one or more embodiments, a HT control information system may define a new control frame to include HT control information. The HT control information system may expand specific HT control information to support important 802.11be features such as, for example, 320 MHz and 16 spatial streams. Accordingly, the HT control information system may still aggregate multiple important control information in one A-MPDU.

In one or more embodiments, the HT control information system may facilitate defining EHT variant control ID information in two additional ways. In one aspect, the HT control information system may create EHT variant HT control by depreciating the HT variant or a very high throughput (VHT) variant and make the EHT variant HT control. The system may use one control ID of A-Control to facilitate EHT variant HT control. The ID may change depending on which variant is used. In another aspect, when the bit B0 is zero, HT control middle may use a bit B1 for HT control middle information.

In one or more embodiments, HT control information system may use an additional control ID as a control ID extension to allow further control ID to be defined in HE variant HT control. For example, the HT control information system may use A-control ID 14 in the HE variant HT control for control ID extension.

HE variant control can include the control ID, followed by an ID extension, then control information. For example, the first field of control ID extension may be a fixed size ID extension field. According to one or more embodiments, the size can be 4 bits. The rest is the control information corresponding based on the indication of control ID extension and ID extension field.

For example, control id may include 11 then control ID 14, 11, then 1110, which adds a different control ID indicative that this is an EHT variant. In another example, control id 14 may indicate a control ID extension defining a subtype in the ID extension. The extension may be followed by the control information that includes link specific. In other aspects, the link-specific information may include bandwidth information, spatial stream information, etc.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of HT control information 142, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 18:
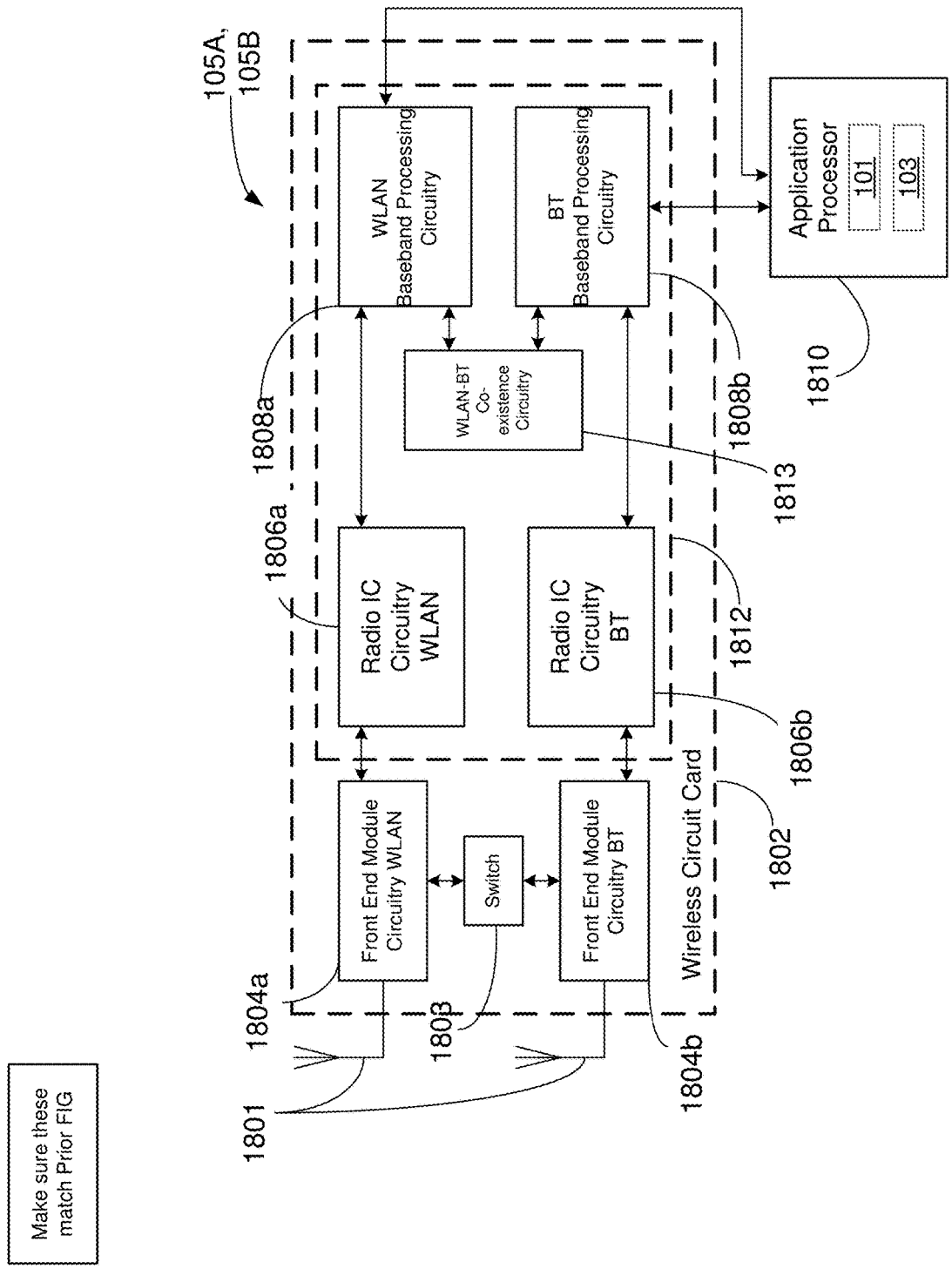
FIG. 18 is a block diagram of a radio architecture in accordance with some examples.
Figure 19:
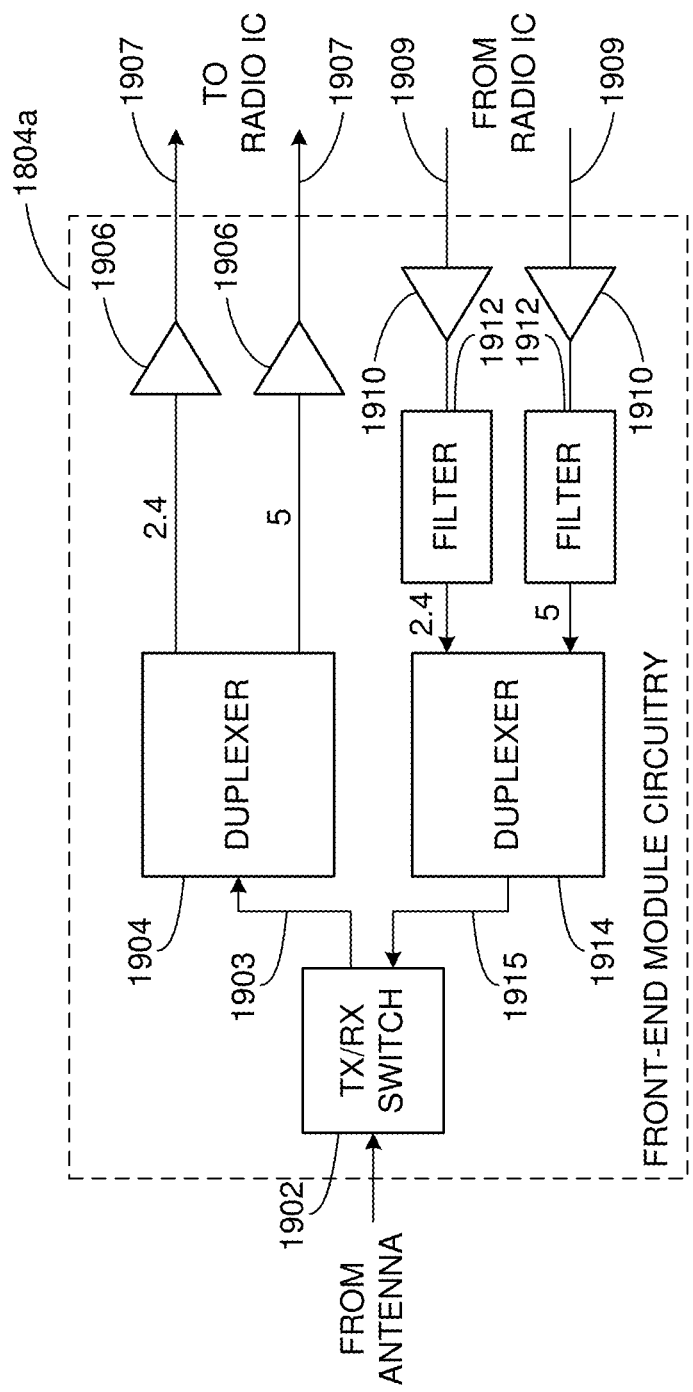
FIG. 19 illustrates an example front-end module circuitry for use in the radio architecture of FIG. 18, in accordance with one or more example embodiments of the present disclosure.

In some embodiments, the user devices 120 and the AP 102 may include one or more computer systems similar to that of the functional diagram of FIG. 18 and/or the example machine/system of FIG. 19.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may facilitate HT control information 142 with one or more user devices 120.

It is understood that the above descriptions are for purposes of illustration and are not meant to be limiting.

Figure 2:
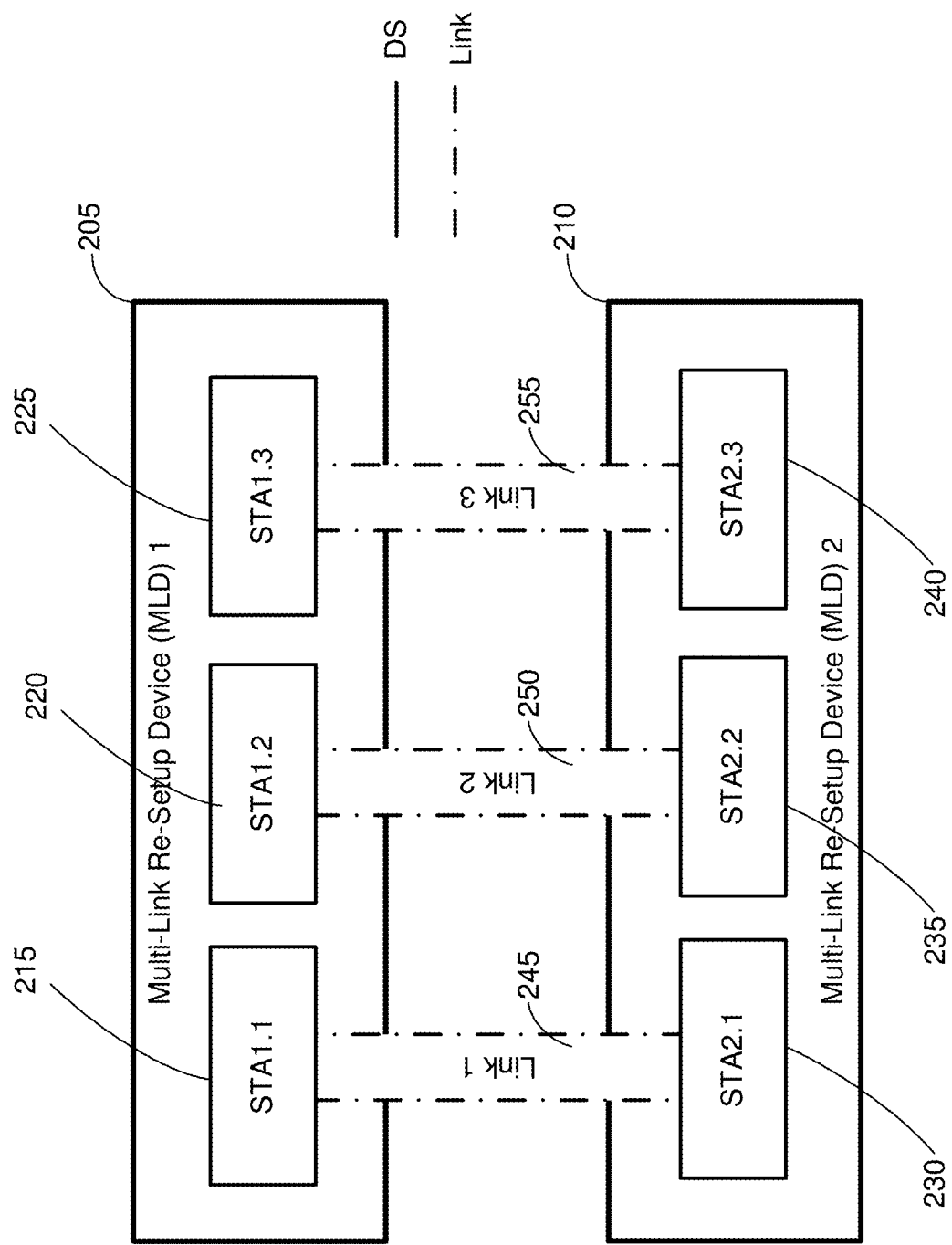
FIG. 2 depicts an illustrative schematic diagram for EHT signaling structure, in accordance with one or more example embodiments of the present disclosure.

FIG. 2 depicts an illustrative schematic diagram for EHT signaling structure, in accordance with one or more example embodiments of the present disclosure. Two MLDs are illustrated that include a MLD 1 205 and a MLD 2 210. The MLD1 205 is shown across from the MLD 210, where the MLD 205 connects wirelessly with the MLD2 210 through a plurality of wireless DS links 245, 250, and 255. The MLD1 205 is depicted in FIG. 2 to include multiple STAs such as a STA1.1 215, a STA1.2 220, and a STA1.3 225 that can set up links with each other. The MLDs 1 and 2 (205 and 210, respectively) may be logical entities that respectively contain one or more STAs. A logical entity has one MAC data service interface and primitives to the logical link control (LLC), and a single address associated with the interface, which can be used to communicate on the distribution system medium (DSM). It should be noted that a Multi-link logical entity allows STAs within the multi-link logical entity to have the same MAC address. It should also be noted that the exact name can be changed. Although three STAs are shown as part of the MLD1 205 and MLD2 210, respectively, it should be appreciated that as few as one STA, and/or many more than three STAs may be included as logical entities associated with the MLD1 205 and/or MLD2 210.

In the example of FIG. 2, the MLD1 205 and MLD2 210 are two separate physical devices, where each one comprises any number of virtual or logical devices. For example, the MLD1 205 may include one, two, three or more STAs, including for example, a STA1.1 215, a STA1.2 220, and a STA1.3 225. The MLD 210 may include three STAs, including a STA2.1 230, a STA2.2 235, and a STA2.3 240. The example shows that the logical device STA1.1 215 is communicating with the logical device STA2.1 230 over the link 1 245, that logical device STA1.2 220 is communicating with the logical device STA2.2 235 over the link 2 250, and the device STA1.3 225 is communicating with the logical device STA2.3 240 over the link 3 255. Although three STAs are shown as part of the MLDs 1 and 2, respectively, it should be appreciated that as few as one STA, and/or many more than three STAs may be included as logical entities associated with the MLD 205 and/or MLD 210.

Embodiments of the present disclosure further include a mechanism to change the entry point mapping through DSM to another AP MLD's MAC data service interface (similar to the functionality of reassociation to a different AP different from the current associated AP). As explained above, disassociation may remove an existing link, and may also remove the AP. This may include renegotiating the link associations by removing some or all of the set-up links. The AP MLD may further remove one basic service set (BSS) by sending group addressed disassociation. For example, changing the entry point mapping through DSM may change the entry point mapping through DSM from the MAC data service interface of the AP MLD1 205 to the MAC data service interface of AP MLD2 210.

Figure 3:
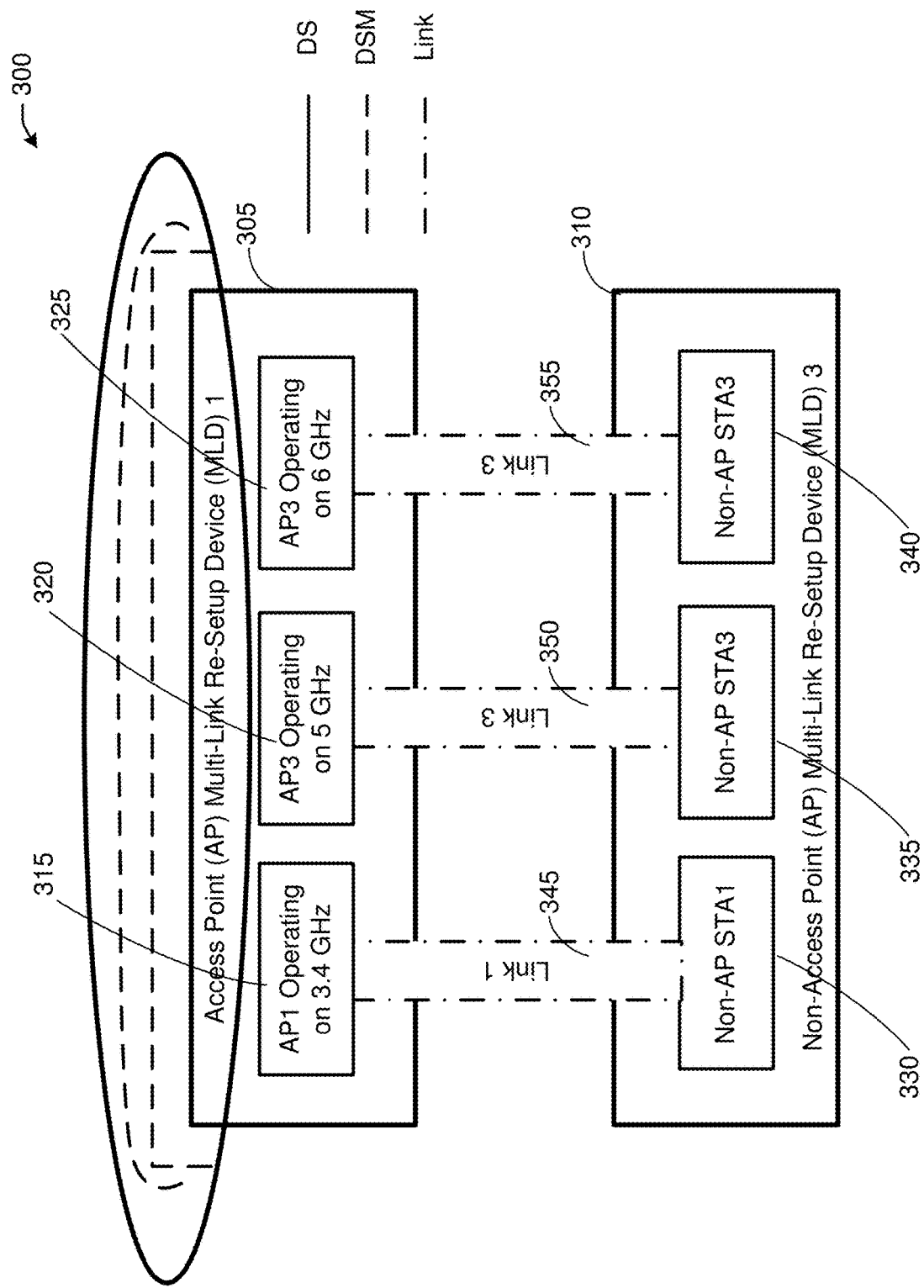
FIG. 3 depicts an illustrative schematic diagram for EHT signaling structure, in accordance with one or more example embodiments of the present disclosure.

FIG. 3 depicts an illustrative schematic diagram for an EHT signaling structure 300 comprising access point (AP) multi-link devices (MLDs) communicating wirelessly with non-AP MLDs, in accordance with one or more example embodiments of the present disclosure. Referring to FIG. 3, there are shown two MLDs including an AP MLD1 305 and a non-AP MLD2 310 depicted on either side of a plurality of links 345, 350, and 355, respectively. The MLD1 305 and the MLD3 310 may include multiple STAs configured for setting up links with each other. For infrastructure framework, the AP MLD 305 may include a plurality of APs (e.g., AP1 315, AP2 320, and AP3 325) on one side. On the other side of the wireless links 345, 350 and 355, respectively, a non-AP MLD3 310 may also include a plurality of non-AP STAs (e.g., a non-AP STA1 330, a non-AP STA2 335, and a non-AP STA3 340).

According to an embodiment of the present disclosure, the EHT signaling structure 300 includes a different AP MLD that the non-AP MLD3 310 changes the entry point mapping through DSM from the MAC data service interface (not shown in FIG. 3) of the AP MLD1 305 to the MAC data service interface of the AP MLD 2 310.

The AP MLD1 305 and the non-AP MLD3 310 are two separate physical devices, where each one comprises a number of virtual or logical devices. For example, the MLD1 305 may include three physical devices, represented in FIG. 3 as APs, such as, for example, the AP1 315 operating on 2.4 GHz, the AP2 320 operating on 5 GHz, and the AP3 325 operating on 6 GHz. Further, the multi-link non-AP MLD3 310 may include three non-AP STAs, including the non-AP STA1 330 communicating with the AP1 315 on the link 1 345, the non-STA2 335 communicating with the AP2 on the link 2 350, and the non-AP STA3 340 communicating with the AP3 325 on link 3. It should be understood that although the example shows three logical entities within the AP MLD1 305 and the three logical entities within the non-AP MLD 3 310, this is merely for illustration purposes and that other numbers of logical entities with each of the multi-link AP and non-AP logical entities may be envisioned.

The MLD1 305 is shown in FIG. 3 to have access to a distribution system (DS), depicted in FIG. 3 as a two-dot dashed line. The DS may be a system used to interconnect a set of BSSs to create an extended service set (ESS). The MLD1 305 is also shown in FIG. 3 to have access a distribution system medium (DSM), which is the medium used by a DS for BSS interconnections. Simply put, DS and DSM allow the AP to communicate with different BSSs. According to one aspect of the present disclosure, a MLD (either the MLD1 305 and/or the MLD 3 310) may remove the entry point mapping (not shown in FIG. 3) through DSM under multi-link (similar to the functionality of disassociation).

Figure 4:
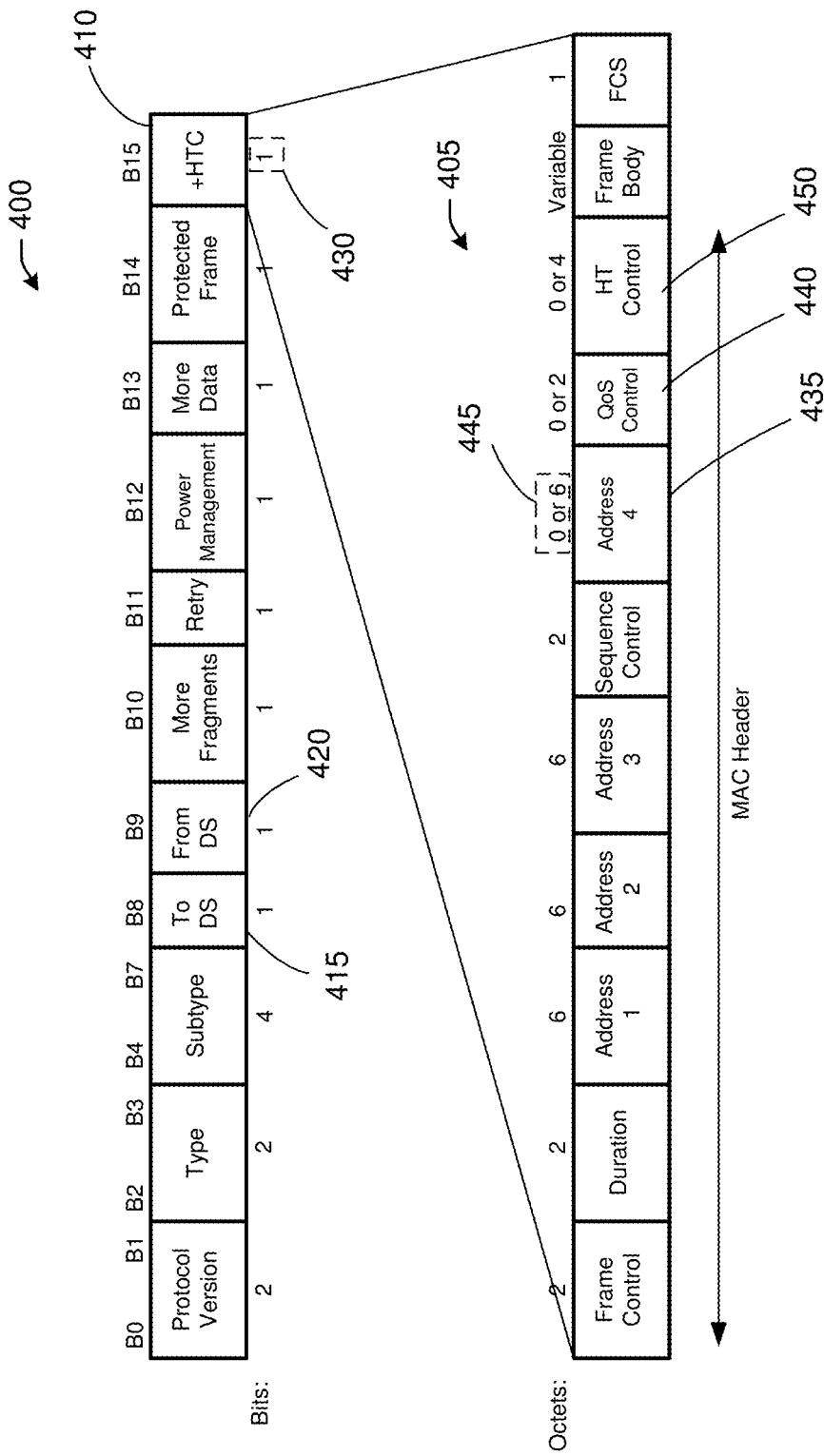
FIG. 4 depicts illustrative schematic diagrams for a frame control field format and a data field, in accordance with one or more embodiments of the present disclosure.

FIG. 4 depicts illustrative schematic diagrams for a frame control field format 400 and a data frame format 405, in accordance with one or more embodiments. The frame control field format 400 includes a High Throughput Control (HTC) field 410, a To DS field 415, and a From DS field 420. The HT control field 410 is used in a QoS Data frame 425 in the data frame format 405 to deliver control information. The presence of the HT control field is indicated by a +HTC subfield 430 in frame control 410. The example data frame format 405 is an expansion of the HT frame control field 410. When the HTC bit +HTC subfield) 430 set to 1, it indicates the presence of the HT Control field.

Note that the existence of address 4 435 is indicated by the To DS (415) and from DS (420) subfields in frame control field format 400. The existence of a QoS Control field 440 is determined by the type/subtype that indicates the QoS Data frame 440. The 0 or 6 fields 445 associated with the address 4 435 are optional fields. When a receiving STA (not shown in FIG. 4) receives the data frame format 405, the receiving device can use the 0 or 6 fields 445 to determine where HTC fields begin in the data transmission. HT control fields 450 are used to indicate, among other things, an HT variant associated with a data frame.

Figure 5:
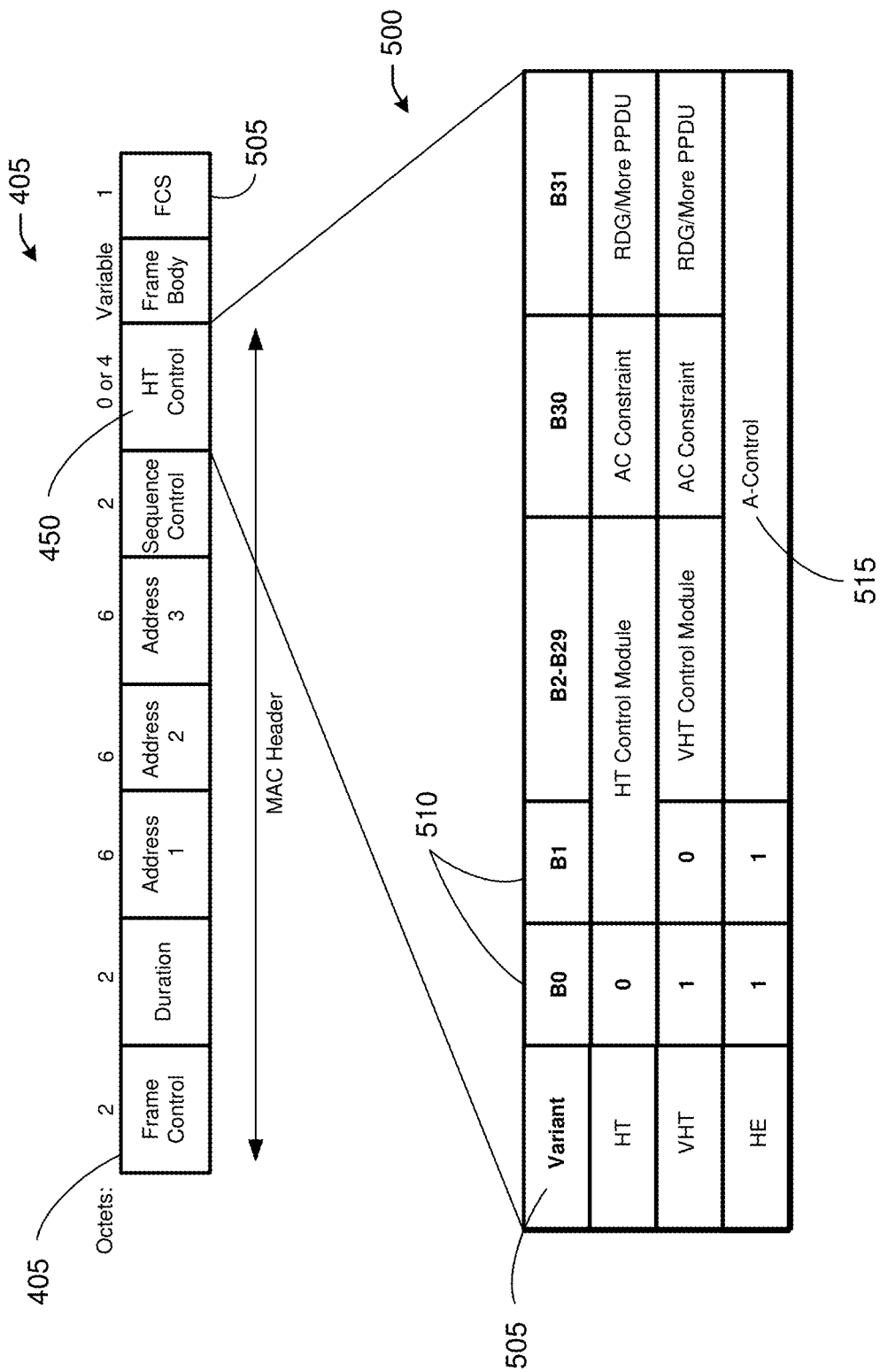
FIG. 5 depicts an illustrative schematic diagram for a management frame format and an HT control field format, in accordance with one or more example embodiments of the present disclosure.

FIG. 5 depicts an illustrative schematic diagram for a management frame format 405 and an HT control field format 500, in accordance with one or more example embodiments of the present disclosure. The HT control field format 500 includes a plurality of HT variants 505 including a HT variant, a VHT variant, and a HE variant.

The HT control field format may provide bit formatting information based on the control bits B0 and B1 510 for each respective variant field 505. Station devices may be configured for one or more of the HT variants 505, which may change based on legacy protocols that may be utilized by the station device. For example, the HT variant may begin with a 0 in the B0 field. The VHT variant may begin with a 1 in the B0 control bit, and the HE variant may include a 1 in the B0 bit field and a 1 in the B1 bit field of the control bit fields 510. Future generations of devices may require additional HT control variants with may require additional control bits 510. To define additional generations of HT devices, the control bit fields would require additional information for defining new device protocols.

In some aspects, in 11ax, the additional information for defining new and/or additional device protocols may be contained in a control subfield (e.g., an A-control container 515). The A-control container is used in the HE variant, and contains 29 bits (bits B2-B31).

Figure 6A:
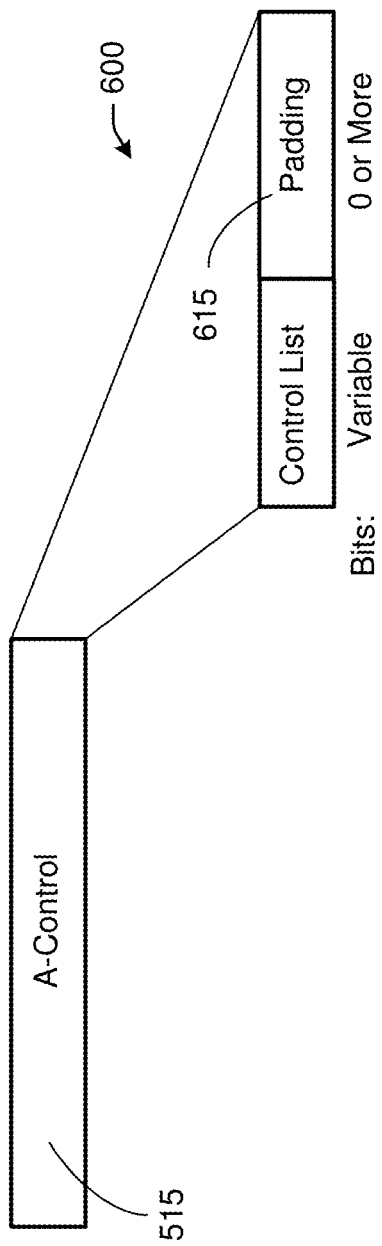
FIG. 6A depicts a control subfield of the HE variant HT control field format, in accordance with one or more example embodiments of the present disclosure.

FIG. 6A depicts a control subfield 600 of the HE variant HT control field format, in accordance with one or more example embodiments of the present disclosure. The A-control container 515 may include a control list 610 having variable number of bits, and a padding portion 615. The control subfield 600 may refer to one or more control IDs of a plurality of control IDs. For each ID control information bay be defined according to a set of control ID subfield values, as illustrated in FIG. 7. The control info may be aggregated. The STA uses a lookup table (9-22) using the control ID, and may aggregate the information. The maximum number of bits that may be aggregated is 30 (control ID is 4 bits plus a maximum of 26 bits of control information).

Figure 6B:
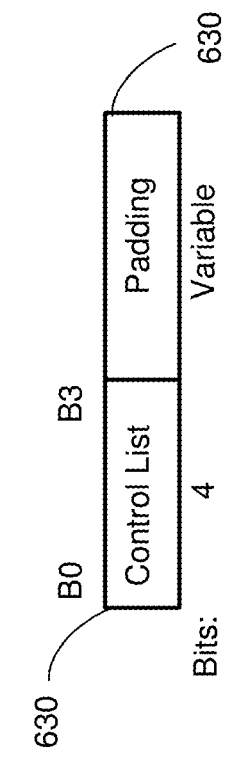
FIG. 6B depicts a control subfield of the HE variant HT control field format, in accordance with one or more example embodiments of the present disclosure.

For example, FIG. 6B depicts an A-control subfield 620 of the HE variant HT control field 450, in accordance with one or more example embodiments of the present disclosure. The A-control subfield 620 include control information. In the case of the HE variant, the control information may include a control list 630 comprising 4 bits in the control ID portion 625, and may include a padding portion (e.g., the control ID subfield value 630) having a variable bit length. For 11ax, various control information may be defined as shown in FIG. 7.

FIG. 7 depicts a control list 700 that includes a table of control ID subfield values 705, in accordance with one or more example embodiments of the present disclosure. The control list 700 may further include a definition or meaning 710 for each respective control ID subfield value 705. Each control ID value in the control ID value column 705 is associated with variable length control information, where each respective length is illustrated in the length of the control information subfield (bits) column 715. The control ID value column 705 includes control ID subfield values 720, 725, 730, 735, 740, 745, 750, 755, and 760.

The control ID value 0 720 is associated with a triggered response scheduling (TRS) control subfield. The TRS control subfield contains TRS information for soliciting an HE TB PPDU that follows an HE MU PPDU, HE SU PPDU or HE ER SU PPDU carrying the control subfield.

The control ID value 1 725 is associated with an operating mode (OM) control subfield. The OM control subfield contains information related to the operating mode (OM) change of the STA transmitting the frame containing this information.

The control ID value 2 730 is associated with an HE link adaptation (HLA) control subfield. The HLA control ID value 3 subfield value 735 contains information related to the HE link adaptation (HLA) procedure.

The control ID value 3 735 is associated with a buffer status report (BSR) control subfield. The BSR control subfield contains buffer status information used for UL MU operation.

The control ID value 4 740 is associated with triggered response scheduling (TRS) UL power headroom (UPH) control. The UPH control subfield contains the UL power headroom (UPH) used for power pre-correction.

The control ID value 5 is associated with bandwidth query report (BQR) control subfield. The BQR control subfield contains a bitmap indicating the subchannels available at the STA transmitting the BQR. Each bit in the bitmap corresponds to a 20 MHz subchannel within the operating channel width of the BSS in which the STA is associated, with the LSB corresponding to the lowest numbered operating subchannel of the BSS. The bit in position X in the bitmap is set to 1 to indicate that the subchannel X+1 is idle; otherwise it is set to 0 to indicate that the subchannel is busy or unavailable.

The control ID value 6 750 is associated with a command and status (CAS) control subfield. The information 715 associated with the control value ID subfield 750 for CAS contains the command and status (CAS) control.

The control ID values 7-14 subfields 755 are associated with reserved bits. According to one or more embodiments of the present disclosure, the control ID values 7-14 may be used to include extended control information.

The control ID value for the ONES subfield 15 760 is associated with an ones need expansion surely (ONES) control subfield.

For each control ID value 720-760, the system can define control information. The STA uses a lookup table (9-22) using the control ID, and may aggregate the information. It should be appreciated, however, that the maximum number of control information size 715 is limited to 26 bits, which also includes aggregated control information. The receiving station may decode the aggregated information to determine how to pass the received control information 715. Accordingly, the maximum number of bits that may be aggregated is 30 (which includes control ID subfield values 705 (4 bits) plus a maximum of 26 bits of control information).

Figure 8:
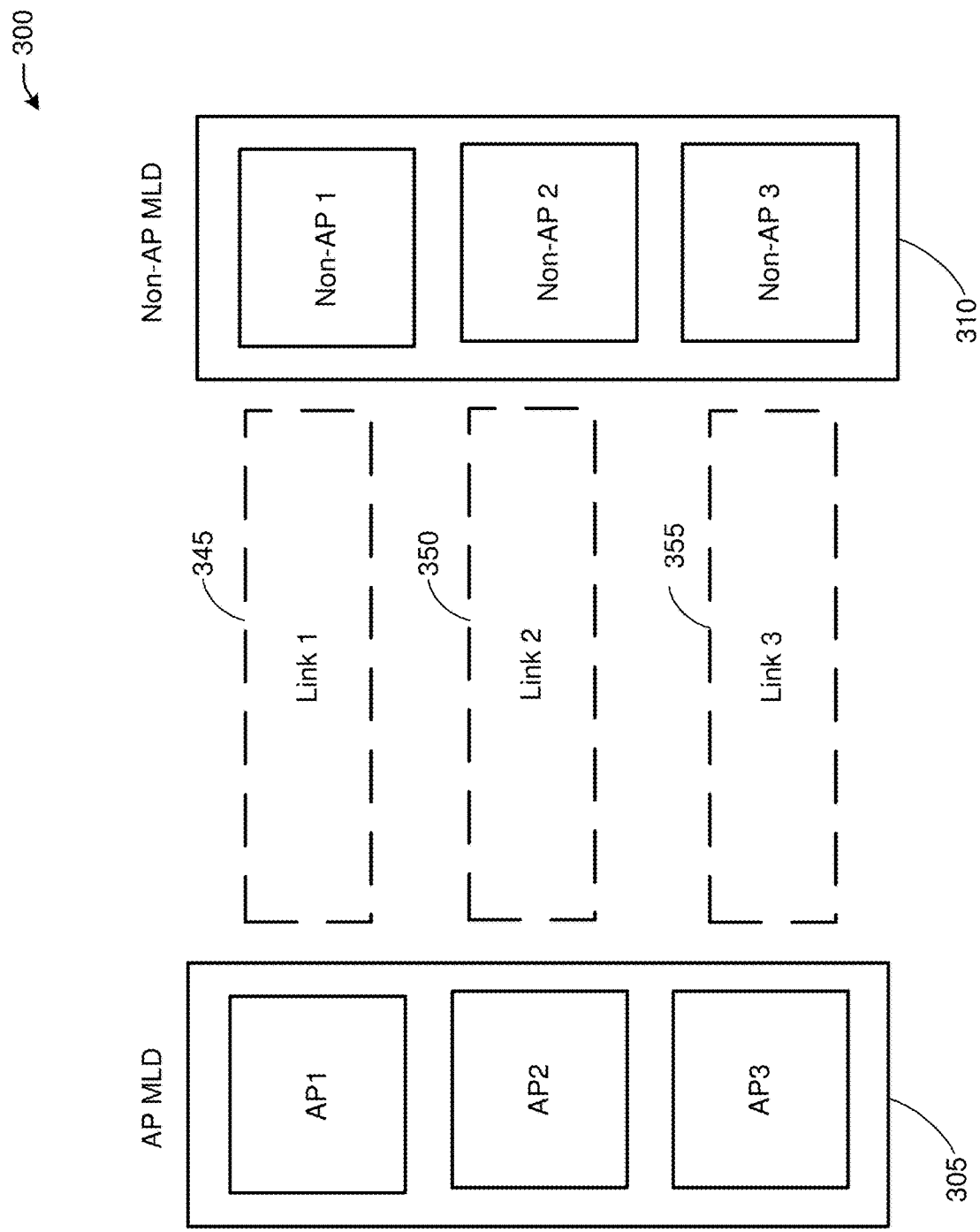
FIG. 8 depicts an illustrative schematic diagram for the EHT signaling structure of FIG. 3, in accordance with one or more example embodiments of the present disclosure.

FIG. 8 depicts an illustrative schematic diagram for the EHT signaling structure 300 of FIG. 3, in accordance with one or more example embodiments of the present disclosure. The EHT signaling structure 300 is illustrated as having the AP MLD1 305 in wireless communication with the non-AP MLD3 310 through a plurality of links 345-355. Multi-link operation can enable two multi-link devices (MLD) to establish more than one link.

Legacy systems require that control for HT variants have fixed lengths. As the trend of indicating control information in data frame continues, we start to face the issue of not being able to include all required control information. For example, all the control information defined in 11ax with 26 bits length of control information, which includes control value IDs associated with TRS 720, HLA 730, and BSR 735, cannot be further extended, which may be required to accommodate MLD signaling structures. Stated another way, two or more control information with a sum length having more than 22 bits cannot be aggregated using conventional signaling structures.

Conventional OM cannot be used if bandwidth is doubled, or if spatial streams are doubled, which may be required for MLD devices. For example, the EHT signaling structure 300 may be configured for 320 MHz and 16 spatial streams. As explained above, the maximum number of bits using legacy control systems include 4 bits of control ID subfield values 705 and a maximum of 26 bits of control information. However, various control information that is needed to support 320 MHz and 16 spatial streams may require requires extension of the control ID values 720-760.

For example, OM 725 and BQR 745, if aggregated, would require extension to accommodate a larger size for the control information subfield bits. When control information is designed for HT control for HT variants, conventional designs may not support 320 MHz and 16 spatial streams, among other features of MLD devices.

Figure 9:
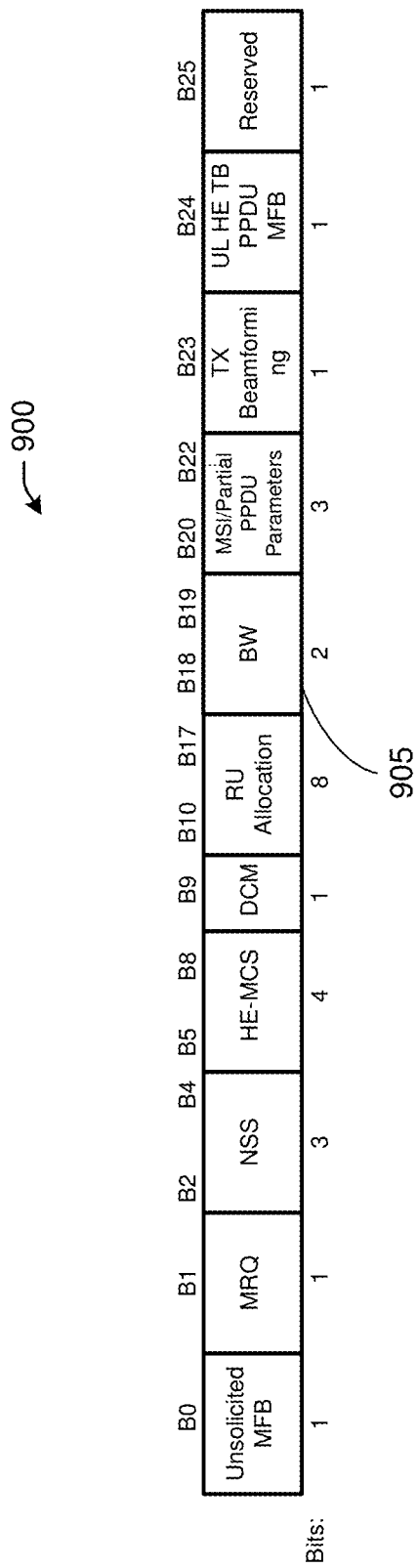
FIG. 9 depicts a control information subfield format in an HLA control subfield, in accordance with one or more example embodiments of the present disclosure.

By way of another example, FIG. 9 depicts a control information subfield format 900 in an HLA control subfield, according to one or more embodiments. The control information subfield format 900 includes, among other fields, a BW subfield 905. HLA control would require two additional bits to extend BW field to 320 MHz and NSS to 16 spatial streams, but there is only one reserved bit available for conventional signaling systems. HLA control needs additional two bits to extend the BW subfield 905 to accommodate information needed to support 320 MHz and NSS to 16 spatial streams, but in conventional systems there is only one reserved bit remaining, which would not provide sufficient control information to support the additional bandwidth and spatial streams.

Figure 10:
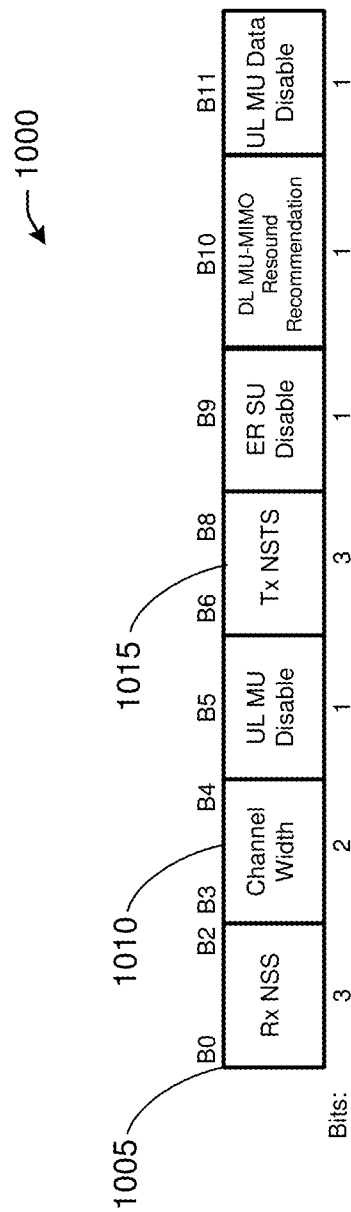
FIG. 10 depicts a control information subfield format in an OM control subfield, in accordance with one or more example embodiments of the present disclosure.

FIG. 10 illustrates a control information subfield format in an OM control subfield associated with the OM control information 725, in accordance with one or more example embodiments of the present disclosure. By way of another example, the control information subfield format 1000 includes, among other fields, receiving (Rx) NSS field 1005, a channel width field 1010, and a transmission number of spatial transmission streams (TX NSTS) field 1015.

UPH and OM (as shown in FIG. 7) are often the two most useful control information. Currently, UPH 740 and OM 725 can be aggregated in one HT control. However, for EHT, it is expected to extend the OM control ID subfield value 705 by at least additional 3 bits, one bit for Rx NSS to 16 spatial streams, one bit for Channel Width to 320 MHz, and one bit for Tx NSTS to 16 spatial streams, which makes the length of the control information subfield for extended OM control 16 bits. The OM 725 may also be extended to include link bitmap. As a result, the extended OM Control 725 cannot be aggregated together with UPH, due to the maximum number of bits limited to 30.

There have been proposals on extending the existing sequence number space by having additional control information in HT control. Note that this extension requires the additional information to be included all the time in data frame for the extension. Except for scalability, the size of the extension will be at least 8 bits. This then implies that the extension cannot be aggregated with extended OM control as well, which then makes extended OM control useless.

According to one or more embodiments, it is advantageous to define information specific to MLDs and other signaling structures. In signaling structures that may not utilize MLD devices, embodiments of the present disclosure may also reduce the volume of control information transmitted to the STA by simplifying the control information. For example, extending additional bits from reserved control ID 455 (as shown in FIG. 7) for OM control information 725 and BQR 745 may be advantageous for adding features such as MLD.

According to one or more embodiments, the HT control information system may aggregate additional sequence number space expansion with other control information. For example, the system may extend the size of specific control information field in various ways.

In one or more embodiments, the HT control information system may increase the size of OM control 725 to a size larger than 12 for the control information subfield bits, which can increase specific HT control information. For example, the HT control information system may add a plurality of additional bits for channel width and spatial streams, and may add one additional bit to extend Rx NSS 1005 to 4 bits, to indicate up to 16 spatial streams. In another aspect, one additional bit may be added to extend Tx NSTS to 4 bits to indicate up to 16 spatial streams. For extending channel width, the HT control information system may add an additional bit that extends Channel Width to indicate up to 320 MHz. The system may also add a plurality of additional bits to indicate the link that the OM applies to during multi-link operation.

In one or more embodiments, encoding may follow the existing encoding of flax OM control by adding the additional bits after the existing encoding. For example, the HT control information system may redefine the encoding to have contiguous bits associated with predetermined extension fields.

In another aspect, the system may extend HLA control to a size larger than 26 bits. This option may only work if HT control size is extended. The HT control information system may add one additional bit to extend the BW subfield 905 to indicate up to 320 MHz. For example, for an EHT signaling structure (e.g., the signaling structure 300), one or more of the links 345-355 may require additional bandwidth. According to embodiments of the present disclosure, the BW subfield 905 may be extended with the additional bit to provide up to 320 MHz of bandwidth. In other aspects, the HT control information system may redefine the BW field, or include the BW subfield 905 information in the control ID variants 510 (as shown in FIG. 5).

According to another embodiment, the HT control information system may extend HLA control size to exceed 26 bits by redefining the encoding to follow the existing encoding of 11ax OM control by adding the additional bits after the control ID fields (e.g., after the control ID value 725 as shown in FIG. 7).

In other aspects, the HT control information system may redefine encoding to have contiguous bits for various extension fields. For example, a first extension field may be defined by a predetermined number N of contiguous bits, a second extension field may be defined by the next N number of contiguous bits, etc. Accordingly, the encoding can follow the existing encoding of 11ax OM control by adding the additional bits after. In another aspect, the HT control information system may redefine encoding to have contiguous bits for various extension fields.

In one or more embodiments, a HT control information system may Expand ONES to the size larger than 26 bits. This option only works if HT control size is extended. For example, the HT control information system may expand the ONES field 760 to be equal to the new size of HT control 450.

In one or more embodiments, a HT control information system may generate new control information to indicate additional bits for sequence number space. For example, the HT control information system may extend the size of the control information to be 8 bits.

In one or more embodiments, a HT control information system may indicate a size of the specific control information field in various ways, including negotiating the size of specific control information based on a negotiated capability of two STAs, or by fixing the size of specific control information for the two EHTs STAs.

For example, in one or more embodiments, the HT control information system may negotiate the size of specific control information based on the capability of the two STAs (e.g., one or more of the user device(s) 120 as shown in FIG. 1). One or more of the connected STAs may indicate a size for specific control fields, such as BQR control bitmap, channel width, receive RX NSS, and transmission number of spatial transmission streams (TX NSTS), and the two devices may agree on the indicated size for decoding the encoding/decoding the transmission.

If the OMI responder and/or initiator supports link ID bitmap, then the HT control information system may extend the size of OM control 725 to include link ID bitmap. For example, the HT control information system may define a size of the link ID bitmap to be equal to the number of links that are setup. The HT control information system may define the size of the link ID bitmap to be equal to the number of affiliated STAs 310 of the AP MLD 305 (as shown in FIG. 8).

The HT control information system may modify the size of the link ID bitmap in various ways to extend the size of the OM control. For example, the size of the link ID bitmap may be equal to the number of links that are setup. In another example, the size of the link ID bitmap may be equal to the number of affiliated STAs of the AP MLD.

In one or more embodiments, responsive to determining that the OMI initiator supports receiving larger than 8 spatial streams, then the HT control information system may extend the size of RX NSS to 4 bits. In another example embodiment, if the system determines that the OMI initiator supports transmitting larger than 8 spatial streams, then the HT control information system may extend the size of TX NSTS to 4 bits.

The HT control information system may further modify the size of the specific control information field based on OMI support factors. For example, in one or more embodiments, responsive to determining that the OMI initiator supports 320 MHz, then the HT control information system may extend the size of channel width to 3 bits.

In one or more embodiments, responsive to determining that the sending station device (e.g., the STA 310) BQR control supports 320/160+160 MHz, then the HT control information system may extend the size of BQR control bitmap in the control value ID subfield 745 to 16 bits.

In one or more embodiments, responsive to determining that the sending STA BQR Control supports 240/160+80/80+160 MHz, then the HT control information system may extend the size of control value ID subfield 745 associated with the BQR Control Bitmap to 12 bits.

In one or more embodiments, responsive to determining that the two STAs are EHT STAs, then the HT control information system may extend the size of Channel Width to 3 bits, the RX NSS to 4 bits, and the TX NSTS to 4 bits.

The HT control information system may redefine the size of the control information using the same control ID. For OM control to be aggregated together with control information to be decoded by 3rd party STA like CAS, the HT control information system may cause the 3rd party device (s) to decode the STA control information ahead of the OM control in the A-control 515. The HT control information system may introduce another control ID for the new size of the control information. For example, the HT control information system may set the control ID 7 to define new OM control with larger size. The HT control information system may define the OM control in various ways. For example, in one aspect, the system may define a new OM control having new OM information, with additional bits. In another aspect, to accommodate legacy OM control features, the HT control information system may generate the OM control first with a new control ID, the new OM, the legacy control ID, and the legacy OM.

OMI is a procedure used between an OMI initiator and an OMI responder. An HE STA that transmits a frame including an OM Control subfield is defined as an OMI initiator. An HE STA with dot11OMI Option implemented equal to true that receives a frame including an OM Control subfield is defined as an OMI responder.

Dynamic indicates the existence of certain fields in specific control information. One bit in OM Control to indicate existence link ID bitmap. The dynamic method maybe used together with negotiated size method. With respect to the dynamic method, according to one or more embodiments, there are multiple ways to aggregate multiple control information due to increased size of specific control information For example, in one or more embodiments, the HT control information system may allow different HT control content in different MPDUs of an A-MPDU. For example, the HT control information system may omit HT control information (e.g., by setting +HTC in frame control to 0).

In another aspect, the HT control information system may utilize Block Ack and multi-STA block ack to indicate if control information in a specific MPDU is received. For example, in some aspects, the HT control information system may extend the size of HT control to be larger than 4 bytes, and may indicate the new HT control size. The extended HT control size may include an added new data subtype that optionally increases the size of HT control based on entries in data subtypes. The new data subtype may be based on being an HT or VHT variant, and may further include an indication of extraneous bits proximate to the HT control field.

For example, according to a first option, the HT control information system may extend the HT control responsive to a negotiation between two EHT STAs or to EHT MLDs to determine whether HT control is going to use a new size. In one or more embodiments, the HT control information system may extend HT control responsive to determining that one entry in data subtype is used for QoS data with HT control extension. In another aspect, the HT control information system may extend HT control responsive to determining that one entry in data subtype is used for QoS Null with HT control extension. The HT control information system may fix the size to a predetermined size, such as, for example, 8 bytes.

According to one or more embodiments, the HT control information system may add padding responsive to determining that the entry type is HT or VHT variant. It should be understood that padding means adding zeroes and 1s to fill the control field information with values. The receiving device may discard or ignore the padding. For example, if the negotiation resolves in the receiving device to be an HT or VHT variant device, then the system may use the extended control field information size, but only use the supported bits for HT or VHT then add a padding to fill the rest of the extended control field information.

The HT control information system may redefine HT control format in this case, where there is no need for the previous two bits to indicate HE version before A-control field.

In one or more embodiments, the HT control information system may determine that a certain field can indicate the length of the A-control field. For example, the size may be 1 bit, 2 bits, 3 bits, etc., which may accommodate various HT control information.

According to a second option, two EHT STAs or two EHT MLDs may negotiate to determine whether HT control is going to use a new size. For example, two EHT STAs or two EHT MLDs can negotiate the exact size to be used say 4 bytes, 8 bytes, or 12 bytes. Padding can be added when it is HT or VHT variant. For example, if the negotiation resolves in the receiving device to be an HT or VHT variant device, then the system may use the extended control field information size, but only use the supported bits for HT or VHT then add a padding to fill the rest of the extended control field information. As an example of this option, a new ID from the control id 7 755 (as shown in FIG. 7) may be used from the reserved bits to indicate the support for the extended control field information size.

According to one or more embodiments, the HT control format can be redefined in this case where there is no need for the previous two bits to indicate HE version before A-control field. One or more fields from the control id 7 755 may be used to indicate the length of the A-control container 515.

According to one or more embodiments, the HT control information system may cause two EHT STAs (e.g., the non-AP MLD 305) or two EHT MLDs (e.g., the AP MLD 305) to negotiate the exact size to be used. Example sizes can include 4 bytes, 8 bytes, or 12 bytes.

In one or more embodiments, the HT control information system may add padding when the HT control information is an HT or VHT variant. The HT control information system may redefine HT control format in this case where there is no need for the previous two bits to indicate HE version before A-control field. For example, new ID 7 may be used from the reserved bits associated with the control ID values 7-14 755 to indicate the support for the extended control field information size.

In one or more embodiments, the HT control information system may determine that a certain field can indicate the length of the A-control field. For example, the control information may indicate the size of HT control.

As a third option, in one or more embodiments, the HT control information system may define a new control frame to include HT control information. The HT control information system may expand specific HT control information to support important 802.11be features such as, for example, 320 MHz and 16 spatial streams. Accordingly, the HT control information system may still aggregate multiple important control information in one A-MPDU.

For example, in one or more embodiments, the HT control information system may set the control ID as the first value one in the HT control field. Additionally, the HT control information system may utilize control information to indicate the size of HT control size. Accordingly, the HT control information system may expand specific HT control information to support important 802.11be features such as, for example, 320 MHz and 16 spatial streams. In some aspects, the HT control information system may still aggregate multiple important control information in one A-MPDU, similar to legacy systems.

There are multiple ways that the system may define the new control frame. In one aspect the new control frame format may include a MAC header plus A-control information and FCS. According to another embodiment, the HT control information system may indicate the size of the control frame by A-MPDU delimiter. In this case, the size of the control may be a multiple of 8 bits. Accordingly, the HT control information system may pad A-Control information to meet this requirement.

According to another embodiment, the HT control information system may derive the size of the control frame from the L-SIG field. The control frame may include one bit to indicate if acknowledgement is required or not.

FIG. 11 depicts a TID subfield value table comprising reserved combinations of Ack Type traffic identifier (TID) subfield values 1105, in accordance with one or more example embodiments of the present disclosure. Multi-STA block Ack is used to acknowledge the reception of this control frame with other MPDUs.

The HT control information system may aggregate the control frame with other MPDUs in an A-MPDU. For example, when the control frame is aggregated with other MPDUs in an A-MPDU, the HT control information system may keep the content of the control frame the same. When the control frame is aggregated with other MPDUs in an A-MPDU, the HT control information system may utilize a Multi-STA block Ack to acknowledge the reception of this control frame with other MPDUs. Accordingly, the HT control information system may use one entry of reserved combo of Ack Type TID subfield values to indicate the control frame acknowledgement context. When the control frame is aggregated with other MPDUs in an A-MPDU the HT control information system may set the Ack Type 1105 to 1. As another example, the HT control information system may set TID 1110 to any value from 8 to 13. The HT control information system may set define the description as the control frame acknowledgement context, where the HT control information system sends the description as an acknowledgement to the new defined control frame. The HT control information system may use the Ack frame only if the control frame is received in an A-MPDU.

The TID subfield values also include reserved bits 1115. According to one or more embodiments, entry of a reserved combination of Ack Type TID subfield value 1105 is used to indicate the Control frame acknowledgement context. For example, the Ack type TID subfield values 1105 can be 0 or 1, and the TID subfield values 1110 can be 0-15. When Ack Type TID subfield value 1105 is set to 1, the TID is set to any value from 8 to 13. The description is control frame acknowledgement context that is sent as an acknowledgement to the new defined control frame. According to one or more embodiments, Ack frame may be used if only the control frame is received in an A-MPDU.

As explained above, part of the major features of 11be are 320 MHz and 16 spatial streams. Various control information requires extension to support 320 MHz and 16 spatial streams. For example, OM and BQR requires extension to have a larger size. Based on the HT control field encoding as shown in FIG. 5, it may be difficult to define a new EHT variant 505. If a new EHT variant of HT control cannot be defined, then control ID space (7 entries remaining) may run out very quick due to the need to define EHT variant of OM, BQR, HLA, and other information like cross link power save.

In one embodiment, the HT control information system may facilitate defining EHT variant control ID information in two additional ways. According to one or more embodiments, in a first option, the HT control information system may create EHT variant HT control by depreciating the HT variant or a very high throughput (VHT) variant and make the EHT variant HT control. For example, as illustrated in FIG. 5, if B0 and B1 are 1, and assuming B2 is 0, then the new EHT variant may be confused with all other control IDs (e.g., the variant VHT) where B2 is 0.

Accordingly, the system may use one control ID of the A-control container 515 to facilitate EHT variant HT control. For example, the control ID may change depending on which variant is used. For example, when the bit B0 is zero, HT control middle may use one bit B1 for HT control middle information.

Figure 12:
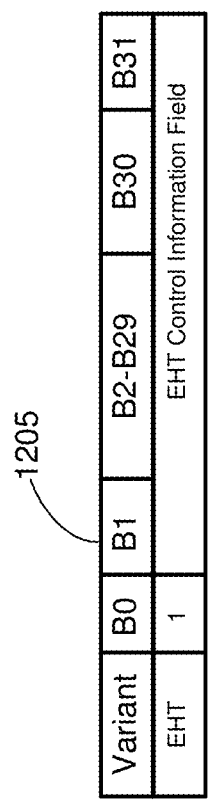
FIG. 12 depicts an HE variant control format for EHT variant control information, in accordance with one or more example embodiments of the present disclosure.
Figure 13:
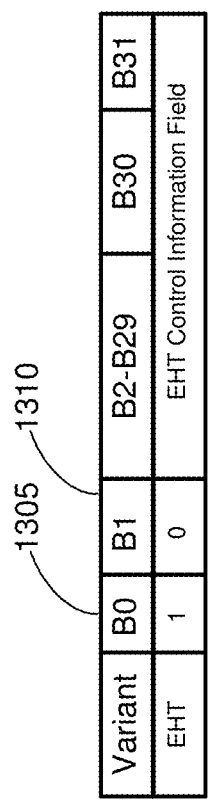
FIG. 13 depicts an HE variant control format for EHT variant control information, in accordance with one or more example embodiments of the present disclosure.

FIG. 12 and FIG. 13 depict HE variant control formats for EHT variant control information, in accordance with one or more example embodiments of the present disclosure.

As shown in FIG. 12, the HT control information system may use an additional control ID 1205 as a control ID extension to allow further control ID to be defined in HE variant HT control. For example, the HT control information system may use A-control ID 14 in the HE variant HT control for control ID extension (e.g., one or more of the reserved bits in control ID value 14 755, as shown in FIG. 7).

As shown in the table below, HE variant control can include the control ID, followed by an ID extension, then control information. For example, the first field of control ID extension may be a fixed size ID extension field. According to one or more embodiments, the size can be 4 bits. The rest is the control information corresponding based on the indication of control ID extension and ID extension field.

| Control ID indicates Control ID extension | ID Extension | Control Information |
| --- | --- | --- |

FIG. 14 illustrates an additional option for HE variant control format for EHT variant control information, where one control ID of HE variant is to create EHT variant HT control, in accordance with one or more example embodiments of the present disclosure. For example, control id may include 10, where B0 1405 is 1 and B1 1410 is 0. The control ID 14 755 (from A-control as shown in FIG. 7) may be used for extending the control id information where the value 1110 may use the first 4 bits of the control ID 14 755. Accordingly, the system may add an additional control ID indicative that this is an EHT variant.

In another example, control id 14 755 may indicate a control ID extension defining a subtype in the ID extension. The extension may be followed by the control information that includes link-specific information (e.g., link 1 345, link 2 350, link 3 355, etc., as illustrated in FIG. 3). In other aspects, the link-specific information may include bandwidth information, spatial stream information, etc.

Figure 15:
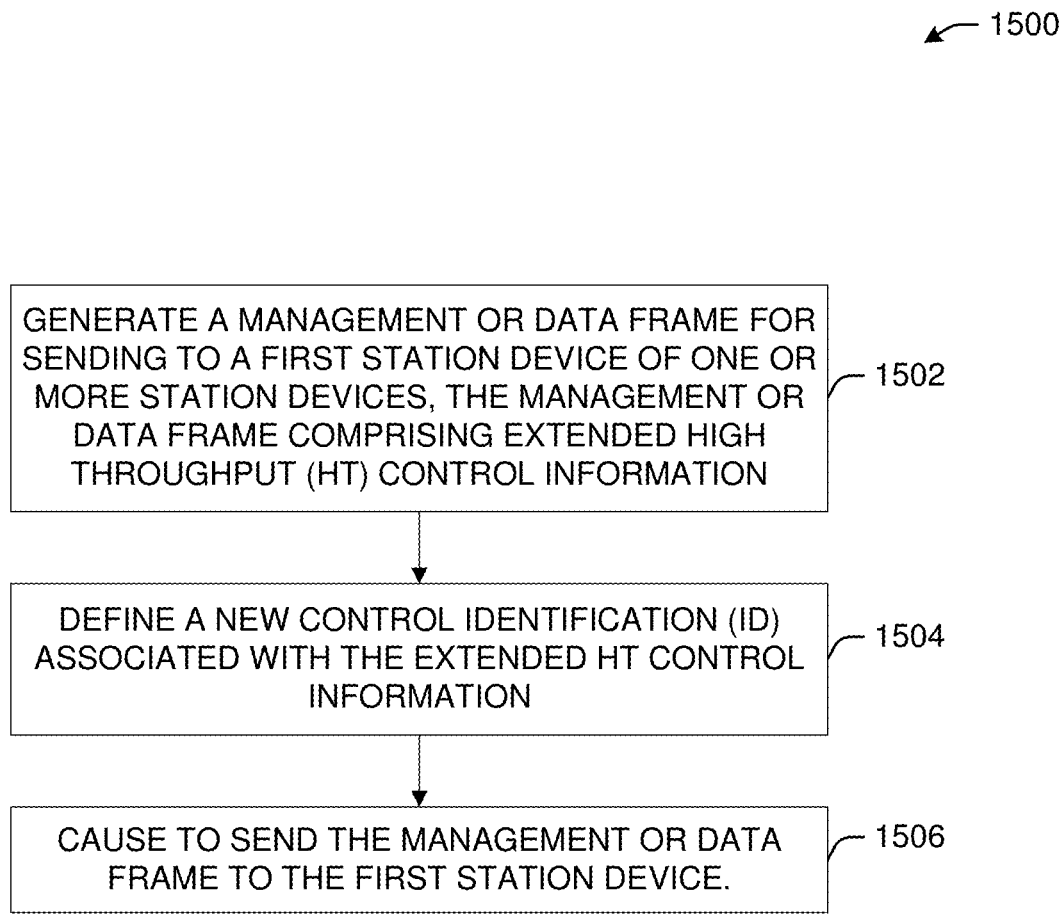
FIG. 15 illustrates a flow diagram of a process for an illustrative HT control information system, in accordance with one or more example embodiments of the present disclosure.

FIG. 15 illustrates a flow diagram of illustrative process 1500 for a HT control information system, in accordance with one or more example embodiments of the present disclosure.

At block 1502, the device may generate a management or data frame for sending to a first station device of one or more station devices, the management or data frame comprising extended high throughput (HT) control information.

At block 1504, the device may define a new control identification (ID) associated with the extended HT control information. The HT control information is the OM control information, and the new control ID may comprise the EHT operating mode (OM) control comprising one control ID field of A-control. The device may generate a specific control information field by extending an operating mode (OM) control to a size larger than 12 bits. The new control ID may comprise a second control ID for a new size of control information. The new control ID may comprise an ID extension comprising one control ID field of A-control. The new control ID may comprise an extremely high throughput (EHT) variant HT control comprising one control ID field of A-control having a follow up fields of A-control for EHT control information. The remaining bits of throughput (EHT) variant HT control includes a series of control ID with control information and EHT variant HT control may comprise a definition of control ID. The ID extension control ID precedes an extended ID field and control information.

At block 1506, the device may cause to send the management or data frame to the first station device. The device may extend a size of a specific control information field by aggregating existing HT control information having an existing control ID with an extended HT control information having a new control ID. The device may determine that an +HTC field is set to 1. The device may generate a new data subtype comprising one entry used for quality of service (QoS) data associated with an extended HT control extension responsive to determining that a HT control field associated with the HT control information is equal to 1. The HT control information may comprise operating mode (OM) control information and the new control ID may comprise an extremely high throughput (EHT) OM control comprising one control ID field of A-control. The HT OM control information for the EHT OM control precedes existing OM control information comprising the existing control ID. The device may negotiate, with the first station device, a data frame and a management frame to use extended size of HT control. The device may generate a new data subtype comprising one entry used for quality of service (QoS) data associated with an extended HT control extension. The device may generate a specific control information field by extending a HE link adaptation (HLA) control to a size larger than 26 bits. The device may generate a specific control information field by extending a ones need expansion surely (ONES) field to a size larger than 26 bits.

It is understood that the above descriptions are for purposes of illustration and are not meant to be limiting.

Figure 16:
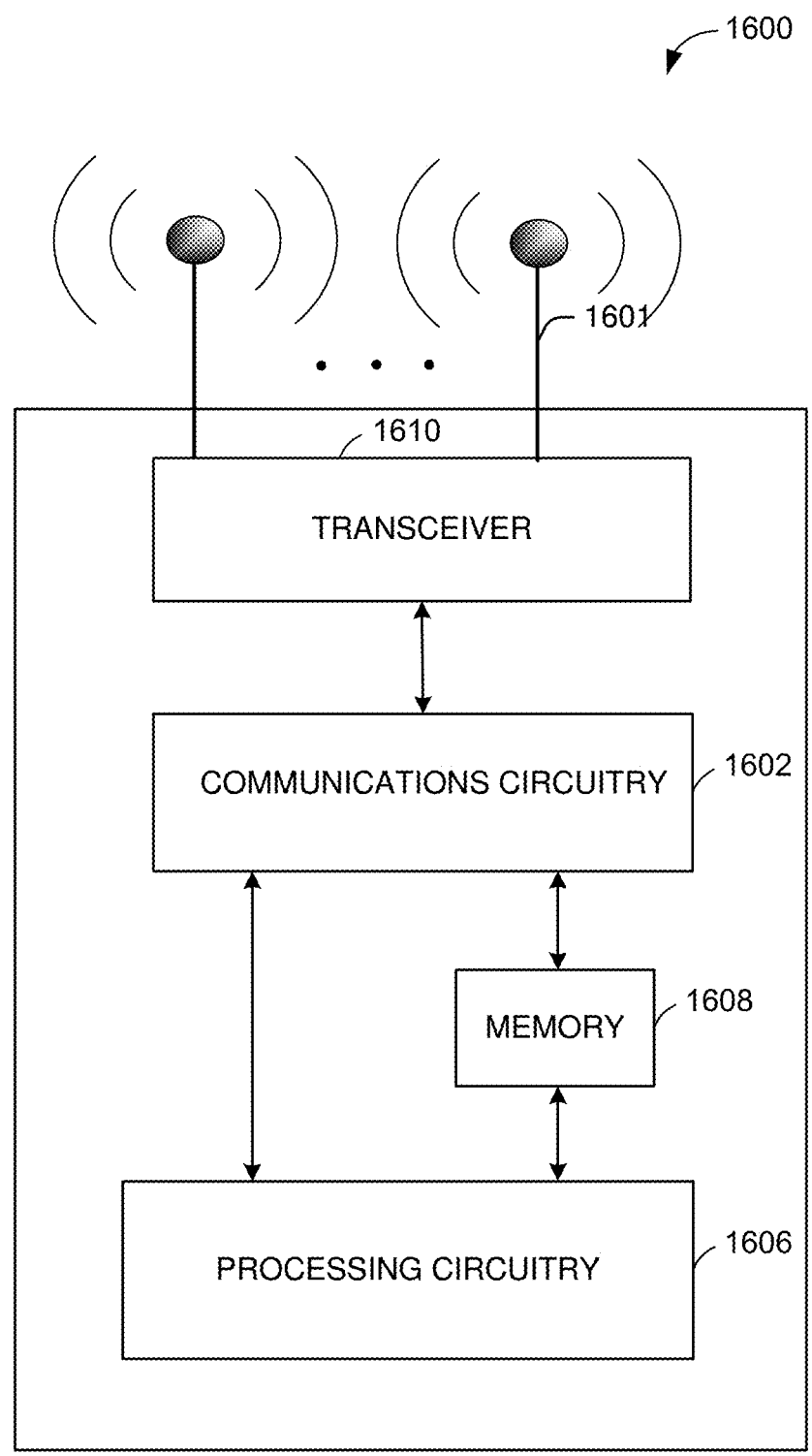
FIG. 16 illustrates a functional diagram of an exemplary communication station that may be suitable for use as a user device, in accordance with one or more example embodiments of the present disclosure.

FIG. 16 shows a functional diagram of an exemplary communication station 1600, in accordance with one or more example embodiments of the present disclosure. In one embodiment, FIG. 16 illustrates a functional block diagram of a communication station that may be suitable for use as an AP 102 (FIG. 1) or a user device 120 (FIG. 1) in accordance with some embodiments. The communication station 1600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1600 may include communications circuitry 1602 and a transceiver 1610 for transmitting and receiving signals to and from other communication stations using one or more antennas 1601. The communications circuitry 1602 may include circuitry that can operate the physical layer (PHY) communications and/or medium access control (MAC) communications for controlling access to the wireless medium, and/or any other communications layers for transmitting and receiving signals. The communication station 1600 may also include processing circuitry 1606 and memory 1608 arranged to perform the operations described herein. In some embodiments, the communications circuitry 1602 and the processing circuitry 1606 may be configured to perform operations detailed in the above figures, diagrams, and flows.

In accordance with some embodiments, the communications circuitry 1602 may be arranged to contend for a wireless medium and configure frames or packets for communicating over the wireless medium. The communications circuitry 1602 may be arranged to transmit and receive signals. The communications circuitry 1602 may also include circuitry for modulation/demodulation, upconversion/downconversion, filtering, amplification, etc. In some embodiments, the processing circuitry 1606 of the communication station 1600 may include one or more processors. In other embodiments, two or more antennas 1601 may be coupled to the communications circuitry 1602 arranged for sending and receiving signals. The memory 1608 may store information for configuring the processing circuitry 1606 to perform operations for configuring and transmitting message frames and performing the various operations described herein. The memory 1608 may include any type of memory, including non-transitory memory, for storing information in a form readable by a machine (e.g., a computer). For example, the memory 1608 may include a computer-readable storage device, read-only memory (ROM), random-access memory (RAM), magnetic disk storage media, optical storage media, flash-memory devices and other storage devices and media.

In some embodiments, the communication station 1600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1600 may include one or more antennas 1601. The antennas 1601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1600 may include one or more of a keyboard, a display, a non-volatile memory port, multiple antennas, a graphics processor, an application processor, speakers, and other mobile device elements. The display may be an LCD screen including a touch screen.

Although the communication station 1600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1600 may include one or more processors and may be configured with instructions stored on a computer-readable storage device.

Figure 17:
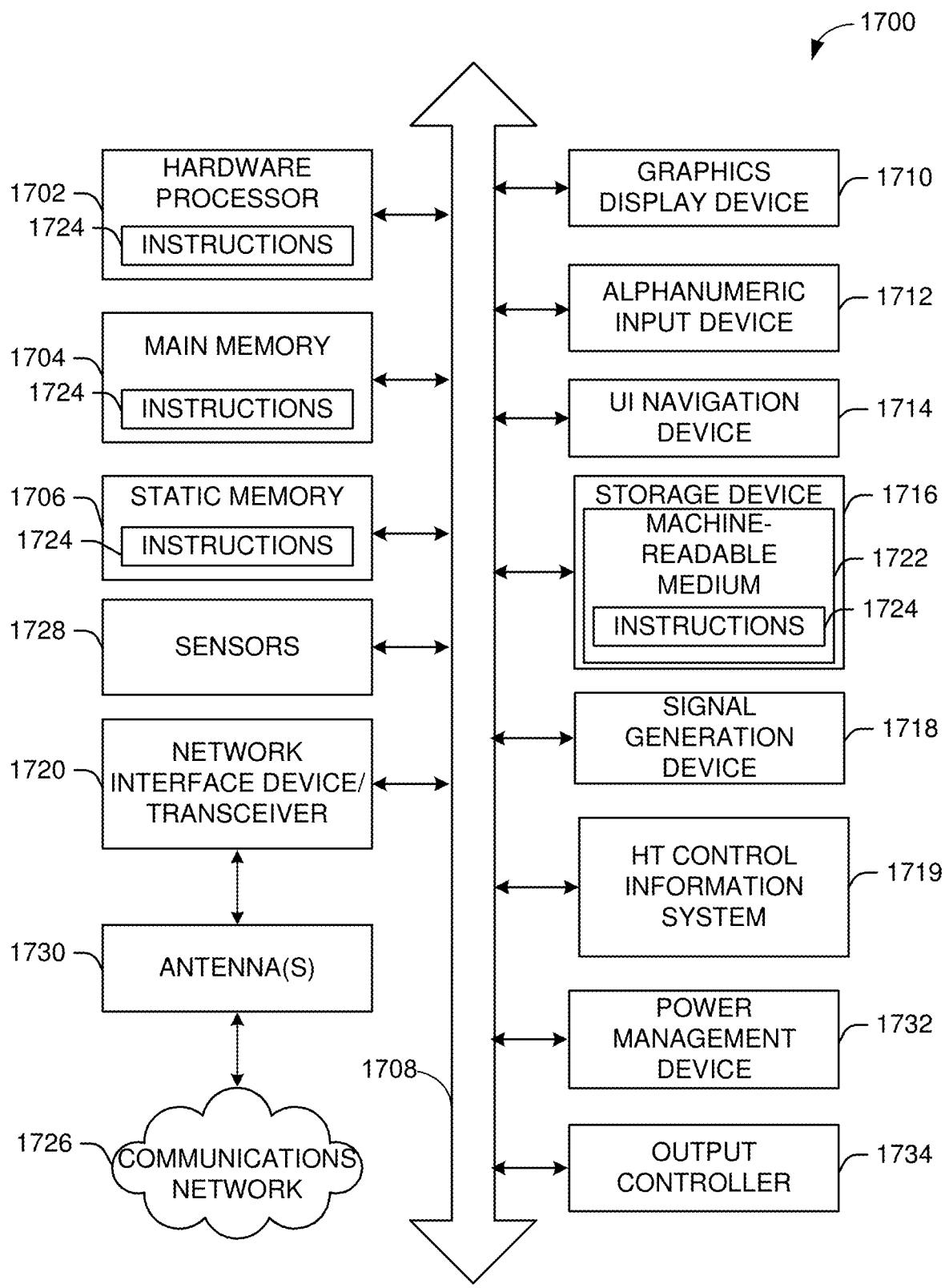
FIG. 17 illustrates a block diagram of an example machine upon which any of one or more techniques (e.g., methods) may be performed, in accordance with one or more example embodiments of the present disclosure.

FIG. 17 illustrates a block diagram of an example of a machine 1700 or system upon which any one or more of the techniques (e.g., methodologies) discussed herein may be performed. In other embodiments, the machine 1700 may operate as a standalone device or may be connected (e.g., networked) to other machines. In a networked deployment, the machine 1700 may operate in the capacity of a server machine, a client machine, or both in server-client network environments. In an example, the machine 1700 may act as a peer machine in peer-to-peer (P2P) (or other distributed) network environments. The machine 1700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1700 may include a hardware processor 1702 (e.g., a central processing unit (CPU), a graphics processing unit (GPU), a hardware processor core, or any combination thereof), a main memory 1704 and a static memory 1706, some or all of which may communicate with each other via an interlink (e.g., bus) 1708. The machine 1700 may further include a power management device 1732, a graphics display device 1710, an alphanumeric input device 1712 (e.g., a keyboard), and a user interface (UI) navigation device 1714 (e.g., a mouse). In an example, the graphics display device 1710, alphanumeric input device 1712, and UI navigation device 1714 may be a touch screen display. The machine 1700 may additionally include a storage device (i.e., drive unit) 1716, a signal generation device 1718 (e.g., a speaker), a HT control information device 1719, a network interface device/transceiver 1720 coupled to antenna(s) 1730, and one or more sensors 1728, such as a global positioning system (GPS) sensor, a compass, an accelerometer, or other sensor. The machine 1700 may include an output controller 1734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 1702 for generation and processing of the baseband signals and for controlling operations of the main memory 1704, the storage device 1716, and/or the HT control information device 1719. The baseband processor may be provided on a single radio card, a single chip, or an integrated circuit (IC).

The storage device 1716 may include a machine readable medium 1722 on which is stored one or more sets of data structures or instructions 1724 (e.g., software) embodying or utilized by any one or more of the techniques or functions described herein. The instructions 1724 may also reside, completely or at least partially, within the main memory 1704, within the static memory 1706, or within the hardware processor 1702 during execution thereof by the machine 1700. In an example, one or any combination of the hardware processor 1702, the main memory 1704, the static memory 1706, or the storage device 1716 may constitute machine-readable media.

The HT control information device 1719 may carry out or perform any of the operations and processes (e.g., process XY00) described and shown above.

It is understood that the above are only a subset of what the HT control information device 1719 may be configured to perform and that other functions included throughout this disclosure may also be performed by the HT control information device 1719.

While the machine-readable medium 1722 is illustrated as a single medium, the term "machine-readable medium" may include a single medium or multiple media (e.g., a centralized or distributed database, and/or associated caches and servers) configured to store the one or more instructions 1724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1700 and that cause the machine 1700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1724 may further be transmitted or received over a communications network 1726 using a transmission medium via the network interface device/transceiver 1720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1720 may include one or more physical jacks (e.g., Ethernet, coaxial, or phone jacks) or one or more antennas to connect to the communications network 1726. In an example, the network interface device/transceiver 1720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

FIG. 18 is a block diagram of a radio architecture 105A, 105B in accordance with some embodiments that may be implemented in any one of the example AP 102 and/or the example STA 120 of FIG. 1. Radio architecture 105A, 105B may include radio front-end module (FEM) circuitry 1804a-b, radio IC circuitry 1806a-b and baseband processing circuitry 1808a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1804a-b may include a WLAN or Wi-Fi FEM circuitry 1804a and a Bluetooth (BT) FEM circuitry 1804b. The WLAN FEM circuitry 1804a may include a receive signal path comprising circuitry configured to operate on WLAN RF signals received from one or more antennas 1801, to amplify the received signals and to provide the amplified versions of the received signals to the WLAN radio IC circuitry 1806a for further processing. The BT FEM circuitry 1804b may include a receive signal path which may include circuitry configured to operate on BT RF signals received from one or more antennas 1801, to amplify the received signals and to provide the amplified versions of the received signals to the BT radio IC circuitry 1806b for further processing. FEM circuitry 1804a may also include a transmit signal path which may include circuitry configured to amplify WLAN signals provided by the radio IC circuitry 1806a for wireless transmission by one or more of the antennas 1801. In addition, FEM circuitry 1804b may also include a transmit signal path which may include circuitry configured to amplify BT signals provided by the radio IC circuitry 1806b for wireless transmission by the one or more antennas. In the embodiment of FIG. 18, although FEM 1804a and FEM 1804b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1806a-b as shown may include WLAN radio IC circuitry 1806a and BT radio IC circuitry 1806b. The WLAN radio IC circuitry 1806a may include a receive signal path which may include circuitry to down-convert WLAN RF signals received from the FEM circuitry 1804a and provide baseband signals to WLAN baseband processing circuitry 1808a. BT radio IC circuitry 1806b may in turn include a receive signal path which may include circuitry to down-convert BT RF signals received from the FEM circuitry 1804b and provide baseband signals to BT baseband processing circuitry 1808b. WLAN radio IC circuitry 1806a may also include a transmit signal path which may include circuitry to up-convert WLAN baseband signals provided by the WLAN baseband processing circuitry 1808a and provide WLAN RF output signals to the FEM circuitry 1804a for subsequent wireless transmission by the one or more antennas 1801. BT radio IC circuitry 1806b may also include a transmit signal path which may include circuitry to up-convert BT baseband signals provided by the BT baseband processing circuitry 1808b and provide BT RF output signals to the FEM circuitry 1804b for subsequent wireless transmission by the one or more antennas 1801. In the embodiment of FIG. 18, although radio IC circuitries 1806a and 1806b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1808a-b may include a WLAN baseband processing circuitry 1808a and a BT baseband processing circuitry 1808b. The WLAN baseband processing circuitry 1808a may include a memory, such as, for example, a set of RAM arrays in a Fast Fourier Transform or Inverse Fast Fourier Transform block (not shown) of the WLAN baseband processing circuitry 1808a. Each of the WLAN baseband circuitry 1808a and the BT baseband circuitry 1808b may further include one or more processors and control logic to process the signals received from the corresponding WLAN or BT receive signal path of the radio IC circuitry 1806a-b, and to also generate corresponding WLAN or BT baseband signals for the transmit signal path of the radio IC circuitry 1806a-b. Each of the baseband processing circuitries 1808a and 1808b may further include physical layer (PHY) and medium access control layer (MAC) circuitry, and may further interface with a device for generation and processing of the baseband signals and for controlling operations of the radio IC circuitry 1806a-b.

Referring still to FIG. 18, according to the shown embodiment, WLAN-BT coexistence circuitry 1813 may include logic providing an interface between the WLAN baseband circuitry 1808a and the BT baseband circuitry 1808b to enable use cases requiring WLAN and BT coexistence. In addition, a switch 1803 may be provided between the WLAN FEM circuitry 1804a and the BT FEM circuitry 1804b to allow switching between the WLAN and BT radios according to application needs. In addition, although the antennas 1801 are depicted as being respectively connected to the WLAN FEM circuitry 1804a and the BT FEM circuitry 1804b, embodiments include within their scope the sharing of one or more antennas as between the WLAN and BT FEMs, or the provision of more than one antenna connected to each of FEM 1804a or 1804b.

In some embodiments, the front-end module circuitry 1804a-b, the radio IC circuitry 1806a-b, and baseband processing circuitry 1808a-b may be provided on a single radio card, such as wireless radio card 1802. In some other embodiments, the one or more antennas 1801, the FEM circuitry 1804a-b and the radio IC circuitry 1806a-b may be provided on a single radio card. In some other embodiments, the radio IC circuitry 1806a-b and the baseband processing circuitry 1808a-b may be provided on a single chip or integrated circuit (IC), such as IC 1812.

In some embodiments, the wireless radio card 1802 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11 ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 1808b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

FIG. 19 illustrates WLAN FEM circuitry 1804a in accordance with some embodiments. Although the example of FIG. 19 is described in conjunction with the WLAN FEM circuitry 1804a, the example of FIG. 19 may be described in conjunction with the example BT FEM circuitry 1804b (FIG. 18), although other circuitry configurations may also be suitable.

In some embodiments, the FEM circuitry 1804a may include a TX/RX switch 1902 to switch between transmit mode and receive mode operation. The FEM circuitry 1804a may include a receive signal path and a transmit signal path. The receive signal path of the FEM circuitry 1804a may include a low-noise amplifier (LNA) 1906 to amplify received RF signals 1903 and provide the amplified received RF signals 1907 as an output (e.g., to the radio IC circuitry 1806a-b (FIG. 18)). The transmit signal path of the circuitry 1804a may include a power amplifier (PA) to amplify input RF signals 1909 (e.g., provided by the radio IC circuitry 1806a-b), and one or more filters 1912, such as band-pass filters (BPFs), low-pass filters (LPFs) or other types of filters, to generate RF signals 1915 for subsequent transmission (e.g., by one or more of the antennas 1801 (FIG. 18)) via an example duplexer 1914.

In some dual-mode embodiments for Wi-Fi communication, the FEM circuitry 1804a may be configured to operate in either the 2.4 GHz frequency spectrum or the 5 GHz frequency spectrum. In these embodiments, the receive signal path of the FEM circuitry 1804a may include a receive signal path duplexer 1904 to separate the signals from each spectrum as well as provide a separate LNA 1906 for each spectrum as shown. In these embodiments, the transmit signal path of the FEM circuitry 1804a may also include a power amplifier 1910 and a filter 1912, such as a BPF, an LPF or another type of filter for each frequency spectrum and a transmit signal path duplexer 1904 to provide the signals of one of the different spectrums onto a single transmit path for subsequent transmission by the one or more of the antennas 1801 (FIG. 18). In some embodiments, BT communications may utilize the 2.4 GHz signal paths and may utilize the same FEM circuitry 1804a as the one used for WLAN communications.

Figure 20:
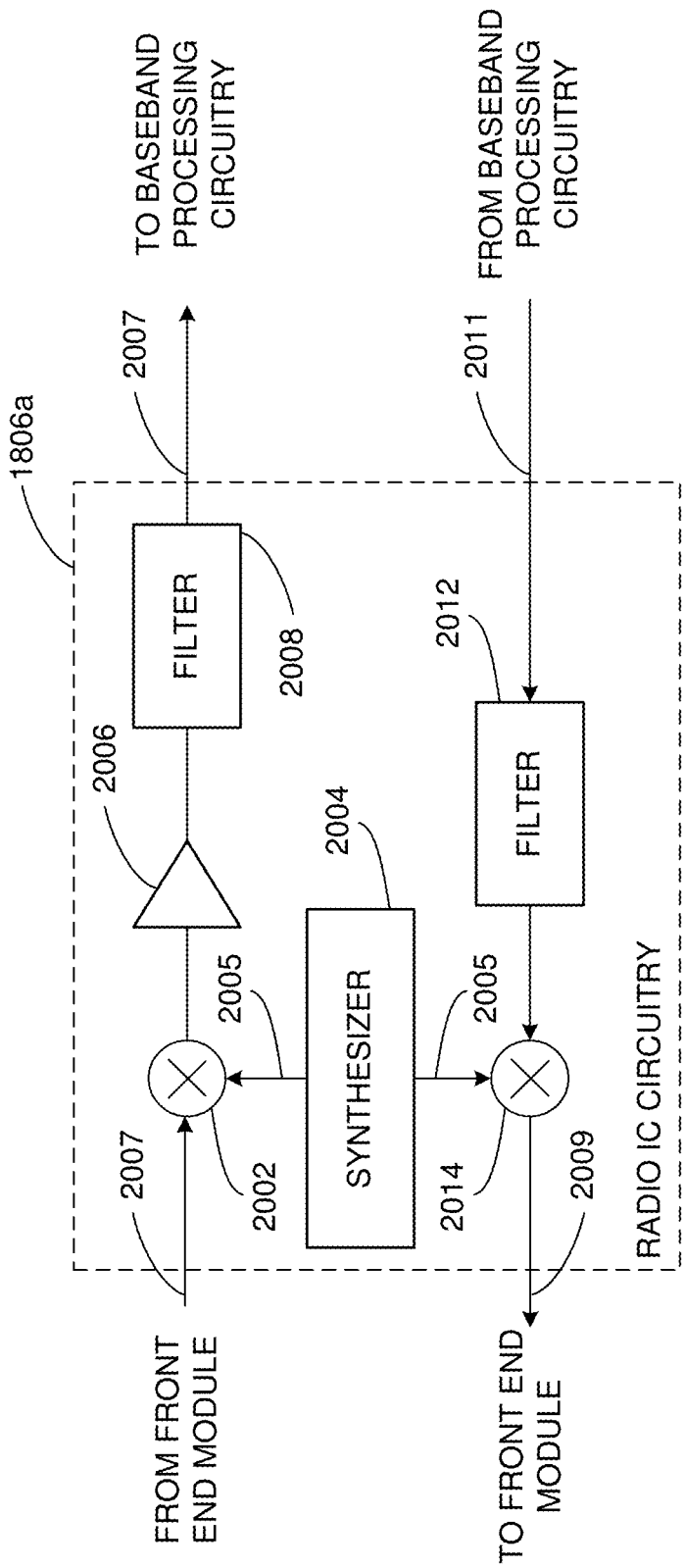
FIG. 20 illustrates an example radio IC circuitry for use in the radio architecture of FIG. 19, in accordance with one or more example embodiments of the present disclosure.

FIG. 20 illustrates radio IC circuitry 1806a in accordance with some embodiments. The radio IC circuitry 1806a is one example of circuitry that may be suitable for use as the WLAN or BT radio IC circuitry 1806a/1806b (FIG. 18), although other circuitry configurations may also be suitable. Alternatively, the example of FIG. 20 may be described in conjunction with the example BT radio IC circuitry 1806b.

In some embodiments, the radio IC circuitry 1806a may include a receive signal path and a transmit signal path. The receive signal path of the radio IC circuitry 1806a may include at least mixer circuitry 2002, such as, for example, down-conversion mixer circuitry, amplifier circuitry 2006 and filter circuitry 2008. The transmit signal path of the radio IC circuitry 1806a may include at least filter circuitry 2012 and mixer circuitry 2014, such as, for example, upconversion mixer circuitry. Radio IC circuitry 1806a may also include synthesizer circuitry 2004 for synthesizing a frequency 2005 for use by the mixer circuitry 2002 and the mixer circuitry 2014. The mixer circuitry 2002 and/or 2014 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 20 illustrates only a simplified version of a radio IC circuitry, and may include, although not shown, embodiments where each of the depicted circuitries may include more than one component. For instance, mixer circuitry 2014 may each include one or more mixers, and filter circuitries 2008 and/or 2012 may each include one or more filters, such as one or more BPFs and/or LPFs according to application needs. For example, when mixer circuitries are of the direct-conversion type, they may each include two or more mixers.

In some embodiments, mixer circuitry 2002 may be configured to down-convert RF signals 1907 received from the FEM circuitry 1804a-b (FIG. 18) based on the synthesized frequency 2005 provided by synthesizer circuitry 2004. The amplifier circuitry 2006 may be configured to amplify the down-converted signals and the filter circuitry 2008 may include an LPF configured to remove unwanted signals from the down-converted signals to generate output baseband signals 2007. Output baseband signals 2007 may be provided to the baseband processing circuitry 1808a-b (FIG. 18) for further processing. In some embodiments, the output baseband signals 2007 may be zero-frequency baseband signals, although this is not a requirement. In some embodiments, mixer circuitry 2002 may comprise passive mixers, although the scope of the embodiments is not limited in this respect.

In some embodiments, the mixer circuitry 2014 may be configured to up-convert input baseband signals 2011 based on the synthesized frequency 2005 provided by the synthesizer circuitry 2004 to generate RF output signals 1909 for the FEM circuitry 1804a-b. The baseband signals 2011 may be provided by the baseband processing circuitry 1808a-b and may be filtered by filter circuitry 2012. The filter circuitry 2012 may include an LPF or a BPF, although the scope of the embodiments is not limited in this respect.

In some embodiments, the mixer circuitry 2002 and the mixer circuitry 2014 may each include two or more mixers and may be arranged for quadrature down-conversion and/or upconversion respectively with the help of synthesizer 2004. In some embodiments, the mixer circuitry 2002 and the mixer circuitry 2014 may each include two or more mixers each configured for image rejection (e.g., Hartley image rejection). In some embodiments, the mixer circuitry 2002 and the mixer circuitry 2014 may be arranged for direct down-conversion and/or direct upconversion, respectively. In some embodiments, the mixer circuitry 2002 and the mixer circuitry 2014 may be configured for super-heterodyne operation, although this is not a requirement.

Mixer circuitry 2002 may comprise, according to one embodiment: quadrature passive mixers (e.g., for the in-phase (I) and quadrature phase (Q) paths). In such an embodiment, RF input signal 1907 from FIG. 20 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 2005 of synthesizer 2004 (FIG. 20). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1907 (FIG. 19) may comprise a balanced signal, although the scope of the embodiments is not limited in this respect. The I and Q baseband output signals may be provided to low-noise amplifier, such as amplifier circuitry 2006 (FIG. 20) or to filter circuitry 2008 (FIG. 20).

In some embodiments, the output baseband signals 2007 and the input baseband signals 2011 may be analog baseband signals, although the scope of the embodiments is not limited in this respect. In some alternate embodiments, the output baseband signals 2007 and the input baseband signals 2011 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 2004 may be a fractional-N synthesizer or a fractional N/N+1 synthesizer, although the scope of the embodiments is not limited in this respect as other types of frequency synthesizers may be suitable. For example, synthesizer circuitry 2004 may be a delta-sigma synthesizer, a frequency multiplier, or a synthesizer comprising a phase-locked loop with a frequency divider. According to some embodiments, the synthesizer circuitry 2004 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 2004 may be provided by a voltage controlled oscillator (VCO), although that is not a requirement. A divider control input may further be provided by either the baseband processing circuitry 1808a-b (FIG. 18) depending on the desired output frequency 2005. In some embodiments, a divider control input (e.g., N) may be determined from a look-up table (e.g., within a Wi-Fi card) based on a channel number and a channel center frequency as determined or indicated by the example application processor 1810. The application processor 1810 may include, or otherwise be connected to, one of the example secure signal converter 101 or the example received signal converter 103 (e.g., depending on which device the example radio architecture is implemented in).

In some embodiments, synthesizer circuitry 2004 may be configured to generate a carrier frequency as the output frequency 2005, while in other embodiments, the output frequency 2005 may be a fraction of the carrier frequency (e.g., one-half the carrier frequency, one-third the carrier frequency). In some embodiments, the output frequency 2005 may be a LO frequency (fLO).

Figure 21:
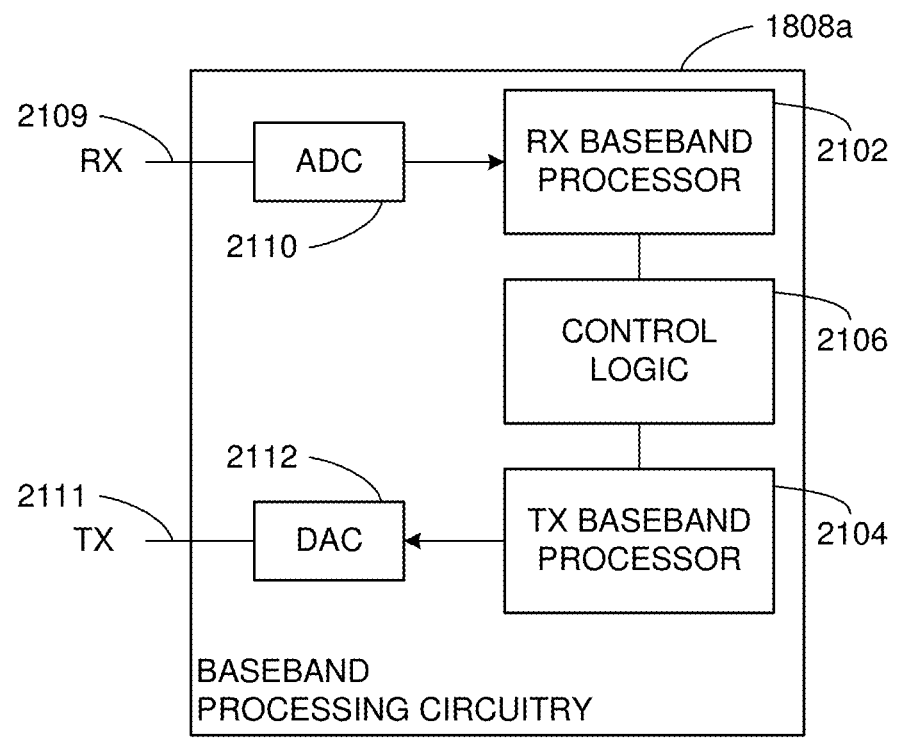
FIG. 21 illustrates an example baseband processing circuitry for use in the radio architecture of FIG. 18, in accordance with one or more example embodiments of the present disclosure.

FIG. 21 illustrates a functional block diagram of baseband processing circuitry 1808a in accordance with some embodiments. The baseband processing circuitry 1808a is one example of circuitry that may be suitable for use as the baseband processing circuitry 1808a (FIG. 18), although other circuitry configurations may also be suitable. Alternatively, the example of FIG. 20 may be used to implement the example BT baseband processing circuitry 1808b of FIG. 18.

The baseband processing circuitry 1808a may include a receive baseband processor (RX BBP) 2102 for processing receive baseband signals 2009 provided by the radio IC circuitry 1806a-b (FIG. 18) and a transmit baseband processor (TX BBP) 2104 for generating transmit baseband signals 2011 for the radio IC circuitry 1806a-b. The baseband processing circuitry 1808a may also include control logic 2106 for coordinating the operations of the baseband processing circuitry 1808a.

In some embodiments (e.g., when analog baseband signals are exchanged between the baseband processing circuitry 1808a-b and the radio IC circuitry 1806a-b), the baseband processing circuitry 1808a may include ADC 2110 to convert analog baseband signals 2109 received from the radio IC circuitry 1806a-b to digital baseband signals for processing by the RX BBP 2102. In these embodiments, the baseband processing circuitry 1808a may also include DAC 2112 to convert digital baseband signals from the TX BBP 2104 to analog baseband signals 2111.

In some embodiments that communicate OFDM signals or OFDMA signals, such as through baseband processor 1808a, the transmit baseband processor 2104 may be configured to generate OFDM or OFDMA signals as appropriate for transmission by performing an inverse fast Fourier transform (IFFT). The receive baseband processor 2102 may be configured to process received OFDM signals or OFDMA signals by performing an FFT. In some embodiments, the receive baseband processor 2102 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 18, in some embodiments, the antennas 1801 (FIG. 18) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1801 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MIS 0) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: generate a management or data frame for sending to a first station device of one or more station devices, the management or data frame comprising extended high throughput (HT) control information; define a new control identification (ID) associated with the extended HT control information; and cause to send the management or data frame to the first station device.

Example 2 may include the device of example 1 and/or some other example herein, wherein the processing circuitry may be further configured to extend a size of a specific control information field by aggregating existing HT control information having an existing control ID with an extended HT control information having a new control ID.

Example 3 may include the device of example 2 and/or some other example herein, wherein aggregating the existing HT control information comprises: increasing the extended HT control information to include more than 4 bytes of information.

Example 4 may include the device of example 2 and/or some other example herein, wherein the processing circuitry may be configured to: determine that an +HTC field may be set to 1; and generate a new data subtype comprising one entry used for quality of service (QoS) data associated with an extended HT control extension responsive to determining that a HT control field associated with the HT control information may be equal to 1.

Example 5 may include the device of example 2 and/or some other example herein, wherein the HT control information comprises operating mode (OM) control information and the new control ID comprises an extremely high throughput (EHT) OM control comprising one control ID field of A-control.

Example 6 may include the device of example 5 and/or some other example herein, wherein the HT OM control information for the EHT OM control precedes existing OM control information comprising the existing control ID.

Example 7 may include the device of example 5 and/or some other example herein, wherein the HT control information may be the OM control information, and the new control ID comprises the EHT operating mode (OM) control comprising one control ID field of A-control; and wherein the processing circuitry may be further configured to generate a specific control information field by extending an operating mode (OM) control to a size larger than 12 bits.

Example 8 may include the device of example 1 and/or some other example herein, wherein the new control ID comprises a second control ID for a new size of control information.

Example 9 may include the device of example 1 and/or some other example herein, wherein the new control ID comprises an ID extension comprising one control ID field of A-control.

Example 10 may include the device of example 1 and/or some other example herein, wherein the new control ID comprises an extremely high throughput (EHT) variant HT control comprising one control ID field of A-control having an follow up fields of A-control for EHT control information.

Example 11 may include the device of example 10 and/or some other example herein, wherein the remaining bits of throughput (EHT) variant HT control may include a series of control ID with control information and EHT variant HT control comprises a definition of control ID.

Example 12 may include the device of example 10 and/or some other example herein, wherein the ID extension control ID precedes an extended ID field and control information.

Example 13 may include the device of example 1 and/or some other example herein, wherein the processing circuitry may be further configured to: negotiate, with the first station device, a data frame and a management frame to use extended size of HT control.

Example 14 may include the device of example 13 and/or some other example herein, wherein the processing circuitry may be configured to: generate a new data subtype comprising one entry used for quality of service (QoS) data associated with an extended HT control extension.

Example 15 may include the device of example 13 and/or some other example herein, wherein the processing circuitry may be further configured to generate a specific control information field by extending a HE link adaptation (HLA) control to a size larger than 26 bits.

Example 16 may include the device of example 13 and/or some other example herein, wherein the processing circuitry may be further configured to generate a specific control information field by extending a ones need expansion surely (ONES) field to a size larger than 26 bits.

Example 17 may include a non-transitory computer-readable medium storing computer-executable instructions which when executed by one or more processors result in performing operations comprising: generating a management or data frame for sending to a first station device of one or more station devices, the management or data frame comprising extended high throughput (HT) control information; defining a new control identification (ID) associated with the extended HT control information; and causing to send the management or data frame to the first station device.

Example 18 may include the non-transitory computer-readable medium of example 17 and/or some other example herein, wherein the operations further comprise extend a size of a specific control information field by aggregating existing HT control information having an existing control ID with an extended HT control information having a new control ID.

Example 19 may include the non-transitory computer-readable medium of example 18 and/or some other example herein, wherein aggregating the existing HT control information comprises: increasing the extended HT control information to include more than 4 bytes of information.

Example 20 may include the non-transitory computer-readable medium of example 18 and/or some other example herein, wherein the processing circuitry may be configured to: determining that an +HTC field may be set to 1; and generating a new data subtype comprising one entry used for quality of service (QoS) data associated with an extended HT control extension responsive to determining that a HT control field associated with the HT control information may be equal to 1.

Example 21 may include the non-transitory computer-readable medium of example 18 and/or some other example herein, wherein the HT control information comprises operating mode (OM) control information and the new control ID comprises an extremely high throughput (EHT) OM control comprising one control ID field of A-control.

Example 22 may include the non-transitory computer-readable medium of example 21 and/or some other example herein, wherein the HT OM control information for the EHT OM control precedes existing OM control information comprising the existing control ID.

Example 23 may include the non-transitory computer-readable medium of example 21 and/or some other example herein, wherein the HT control information may be the OM control information, and the new control ID comprises the EHT operating mode (OM) control comprising one control ID field of A-control; and wherein the operations further comprise generating a specific control information field by extending an operating mode (OM) control to a size larger than 12 bits.

Example 24 may include the non-transitory computer-readable medium of example 17 and/or some other example herein, wherein the new control ID comprises a second control ID for a new size of control information.

Example 25 may include the non-transitory computer-readable medium of example 17 and/or some other example herein, wherein the new control ID comprises an ID extension comprising one control ID field of A-control.

Example 26 may include the non-transitory computer-readable medium of example 17 and/or some other example herein, wherein the new control ID comprises an extremely high throughput (EHT) variant HT control comprising one control ID field of A-control having a follow up fields of A-control for EHT control information.

Example 27 may include the non-transitory computer-readable medium of example 26 and/or some other example herein, wherein the remaining bits of throughput (EHT) variant HT control may include a series of control ID with control information and EHT variant HT control comprises a definition of control ID.

Example 28 may include the non-transitory computer-readable medium of example 26 and/or some other example herein, wherein the ID extension control ID precedes an extended ID field and control information.

Example 29 may include the non-transitory computer-readable medium of example 17 and/or some other example herein, wherein the operations further comprise: negotiating, with the first station device, a data frame and a management frame to use extended size of HT control.

Example 30 may include the non-transitory computer-readable medium of example 29 and/or some other example herein, wherein the processing circuitry may be configured to: generating a new data subtype comprising one entry used for quality of service (QoS) data associated with an extended HT control extension.

Example 31 may include the non-transitory computer-readable medium of example 29 and/or some other example herein, wherein the operations further comprise generating a specific control information field by extending a HE link adaptation (HLA) control to a size larger than 26 bits.

Example 32 may include the non-transitory computer-readable medium of example 29 and/or some other example herein, wherein the operations further comprise generating a specific control information field by extending a ones need expansion surely (ONES) field to a size larger than 26 bits.

Example 33 may include a method comprising: generating a management or data frame for sending to a first station device of one or more station devices, the management or data frame comprising extended high throughput (HT) control information; defining a new control identification (ID) associated with the extended HT control information; and causing to send the management or data frame to the first station device.

Example 34 may include the method of example 33 and/or some other example herein, further comprising extend a size of a specific control information field by aggregating existing HT control information having an existing control ID with an extended HT control information having a new control ID.

Example 35 may include the method of example 34 and/or some other example herein, wherein aggregating the existing HT control information comprises: increasing the extended HT control information to include more than 4 bytes of information.

Example 36 may include the method of example 34 and/or some other example herein, wherein the processing circuitry may be configured to: determining that an +HTC field may be set to 1; and generating a new data subtype comprising one entry used for quality of service (QoS) data associated with an extended HT control extension responsive to determining that a HT control field associated with the HT control information may be equal to 1.

Example 37 may include the method of example 34 and/or some other example herein, wherein the HT control information comprises operating mode (OM) control information and the new control ID comprises an extremely high throughput (EHT) OM control comprising one control ID field of A-control.

Example 38 may include the method of example 37 and/or some other example herein, wherein the HT OM control information for the EHT OM control precedes existing OM control information comprising the existing control ID.

Example 39 may include the method of example 37 and/or some other example herein, wherein the HT control information may be the OM control information, and the new control ID comprises the EHT operating mode (OM) control comprising one control ID field of A-control; and further comprising generating a specific control information field by extending an operating mode (OM) control to a size larger than 12 bits.

Example 40 may include the method of example 33 and/or some other example herein, wherein the new control ID comprises a second control ID for a new size of control information.

Example 41 may include the method of example 33 and/or some other example herein, wherein the new control ID comprises an ID extension comprising one control ID field of A-control.

Example 42 may include the method of example 33 and/or some other example herein, wherein the new control ID comprises an extremely high throughput (EHT) variant HT control comprising one control ID field of A-control having an follow up fields of A-control for EHT control information.

Example 43 may include the method of example 42 and/or some other example herein, wherein the remaining bits of throughput (EHT) variant HT control may include a series of control ID with control information and EHT variant HT control comprises a definition of control ID.

Example 44 may include the method of example 42 and/or some other example herein, wherein the ID extension control ID precedes an extended ID field and control information.

Example 45 may include the method of example 33 and/or some other example herein, further comprising: negotiating, with the first station device, a data frame and a management frame to use extended size of HT control.

Example 46 may include the method of example 45 and/or some other example herein, wherein the processing circuitry may be configured to: generating a new data subtype comprising one entry used for quality of service (QoS) data associated with an extended HT control extension.

Example 47 may include the method of example 45 and/or some other example herein, further comprising generating a specific control information field by extending a HE link adaptation (HLA) control to a size larger than 26 bits.

Example 48 may include the method of example 45 and/or some other example herein, further comprising generating a specific control information field by extending a ones need expansion surely (ONES) field to a size larger than 26 bits.

Example 49 may include an apparatus comprising means for: generating a management or data frame for sending to a first station device of one or more station devices, the management or data frame comprising extended high throughput (HT) control information; defining a new control identification (ID) associated with the extended HT control information; and causing to send the management or data frame to the first station device.

Example 50 may include the apparatus of example 49 and/or some other example herein, further comprising extend a size of a specific control information field by aggregating existing HT control information having an existing control ID with an extended HT control information having a new control ID.

Example 51 may include the apparatus of example 50 and/or some other example herein, wherein aggregating the existing HT control information comprises: increasing the extended HT control information to include more than 4 bytes of information.

Example 52 may include the apparatus of example 51 and/or some other example herein, wherein the processing circuitry may be configured to: determining that an +HTC field may be set to 1; and generating a new data subtype comprising one entry used for quality of service (QoS) data associated with an extended HT control extension responsive to determining that a HT control field associated with the HT control information may be equal to 1.

Example 53 may include the apparatus of example 51 and/or some other example herein, wherein the HT control information comprises operating mode (OM) control information and the new control ID comprises an extremely high throughput (EHT) OM control comprising one control ID field of A-control.

Example 54 may include the apparatus of example 51 and/or some other example herein, wherein the HT OM control information for the EHT OM control precedes existing OM control information comprising the existing control ID.

Example 55 may include the apparatus of example 51 and/or some other example herein, wherein the HT control information may be the OM control information, and the new control ID comprises the EHT operating mode (OM) control comprising one control ID field of A-control; and further comprising generating a specific control information field by extending an operating mode (OM) control to a size larger than 12 bits.

Example 56 may include the apparatus of example 50 and/or some other example herein, wherein the new control ID comprises a second control ID for a new size of control information.

Example 57 may include the apparatus of example 50 and/or some other example herein, wherein the new control ID comprises an ID extension comprising one control ID field of A-control.

Example 58 may include the apparatus of example 50 and/or some other example herein, wherein the new control ID comprises an extremely high throughput (EHT) variant HT control comprising one control ID field of A-control having an follow up fields of A-control for EHT control information.

Example 59 may include the apparatus of example 58 and/or some other example herein, wherein the remaining bits of throughput (EHT) variant HT control may include a series of control ID with control information and EHT variant HT control comprises a definition of control ID.

Example 60 may include the apparatus of example 58 and/or some other example herein, wherein the ID extension control ID precedes an extended ID field and control information.

Example 61 may include the apparatus of example 50 and/or some other example herein, further comprising: negotiating, with the first station device, a data frame and a management frame to use extended size of HT control.

Example 62 may include the apparatus of example 61 and/or some other example herein, wherein the processing circuitry may be configured to: generating a new data subtype comprising one entry used for quality of service (QoS) data associated with an extended HT control extension.

Example 63 may include the apparatus of example 61 and/or some other example herein, further comprising generating a specific control information field by extending a HE link adaptation (HLA) control to a size larger than 26 bits.

Example 64 may include the apparatus of example 61 and/or some other example herein, further comprising generating a specific control information field by extending a ones need expansion surely (ONES) field to a size larger than 26 bits.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device comprising processing circuitry coupled to storage, the processing circuitry configured to:
    generate a management or data frame for sending to a first station device of one or more station devices, the management or data frame comprising extended high throughput (HT) control information;
    define a new control identification (ID) associated with the extended HT control information, the new control ID comprising a receive number of spatial streams indicator for up to sixteen spatial streams, a transmit number of spatial streams indicator for up to sixteen spatial streams, and a channel width indicator for a 320 MHz bandwidth; and
    cause to send the management or data frame to the first station device.

2. The device of claim 1, wherein the processing circuitry is further configured to extend a size of a specific control information field by aggregating existing HT control information having an existing control ID with an extended HT control information having a new control ID.

3. The device of claim 2, wherein aggregating the existing HT control information comprises:
    increasing the extended HT control information to include more than 4 bytes of information.

4. The device of claim 2, wherein the processing circuitry is configured to:
    determine that an +HTC field is set to 1; and
    generate a new data subtype comprising one entry used for quality of service (QoS) data associated with an extended HT control extension responsive to determining that a HT control field associated with the HT control information is equal to 1.

5. The device of claim 2, wherein the HT control information comprises operating mode (OM) control information and the new control ID comprises an extremely high throughput (EHT) OM control comprising one control ID field of A-control.

6. The device of claim 5, wherein the HT OM control information for the EHT OM control precedes existing OM control information comprising the existing control ID.

7. The device of claim 5, wherein the HT control information is the OM control information, and the new control ID comprises the EHT operating mode (OM) control comprising one control ID field of A-control; and
wherein the processing circuitry is further configured to generate a specific control information field by extending an operating mode (OM) control to a size larger than 12 bits.

8. The device of claim 1, wherein the new control ID comprises a second control ID for a new size of control information.

9. The device of claim 1, wherein the new control ID comprises an ID extension comprising one control ID field of A-control.

10. The device of claim 1, wherein the new control ID comprises an extremely high throughput (EHT) variant HT control comprising one control ID field of A-control having a follow-up field of A-control for EHT control information.

11. The device of claim 10, wherein the remaining bits of throughput (EHT) variant HT control includes a series of control ID with control information and EHT variant HT control comprises a definition of control ID.

12. The device of claim 10, wherein the ID extension control ID precedes an extended ID field and control information.

13. The device of claim 1, wherein the processing circuitry is further configured to:
negotiate, with the first station device, a data frame and a management frame to use extended size of HT control.

14. The device of claim 13, wherein the processing circuitry is configured to:
generate a new data subtype comprising one entry used for quality of service (QoS) data associated with an extended HT control extension.

15. The device of claim 13, wherein the processing circuitry is further configured to generate a specific control information field by extending a HE link adaptation (HLA) control to a size larger than 26 bits.

16. The device of claim 13, wherein the processing circuitry is further configured to generate a specific control information field by extending a ones need expansion surely (ONES) field to a size larger than 26 bits.

17. The device of claim 1, further comprising a transceiver configured to transmit and receive wireless signals.

18. The device of claim 17, further comprising an antenna coupled to the transceiver to cause to send the management or data frame.

19. A non-transitory computer-readable medium storing computer-executable instructions which when executed by one or more processors result in performing operations comprising:
generating a management or data frame for sending to a first station device of one or more station devices, the management or data frame comprising extended high throughput (HT) control information;
defining a new control identification (ID) associated with the extended HT control information, the new control ID comprising a receive number of spatial streams indicator for up to sixteen spatial streams, a transmit number of spatial streams indicator for up to sixteen spatial streams, and a channel width indicator for a 320 MHz bandwidth; and
causing to send the management or data frame to the first station device.

20. A method comprising:
generating a management or data frame for sending to a first station device of one or more station devices, the management or data frame comprising extended high throughput (HT) control information;
defining a new control identification (ID) associated with the extended HT control information, the new control ID comprising a receive number of spatial streams indicator for up to sixteen spatial streams, a transmit number of spatial streams indicator for up to sixteen spatial streams, and a channel width indicator for a 320 MHz bandwidth; and
causing to send the management or data frame to the first station device.

* * * * *